| (12) | United States Patent | (10) Patent No.: | US 10,892,875 B2 |
|---|---|---|---|
| | Ahn et al. | (45) Date of Patent: | Jan. 12, 2021 |

(54) METHOD AND APPARATUS FOR TRANSMITTING ACK/NACK IN A WIRELESS COMMUNICATION SYSTEM BASED ON TDD

(71) Applicant: LG ELECTRONICS INC., Seoul (KR)

(72) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/873,411

(22) Filed: Jan. 17, 2018

(65) Prior Publication Data

US 2018/0145816 A1     May 24, 2018

Related U.S. Application Data

(63) Continuation of application No. 15/583,779, filed on May 1, 2017, now Pat. No. 10,305,663, which is a continuation of application No. 14/991,754, filed on Jan. 8, 2016, now Pat. No. 9,680,589, which is a continuation of application No. 13/992,896, filed as application No. PCT/KR2011/009529 on Dec. 12, 2011, now Pat. No. 9,270,399.

(Continued)

(51) Int. Cl.
*H04L 5/00*     (2006.01)
*H04B 7/26*     (2006.01)
(Continued)

(52) U.S. Cl.
CPC ......... *H04L 5/0055* (2013.01); *H04B 7/2656* (2013.01); *H04J 3/1694* (2013.01);
(Continued)

(58) Field of Classification Search
None
See application file for complete search history.

(56) References Cited

U.S. PATENT DOCUMENTS

2005/0201319 A1    9/2005   Lee et al.
2010/0165939 A1    7/2010   Lin
(Continued)

FOREIGN PATENT DOCUMENTS

CN     101478383     7/2009
CN     101489255     7/2009
(Continued)

OTHER PUBLICATIONS

Motorola, "Introduction of Rel-10 LTE-Advanced features in 36.213," 3GPP TSG-RAN Meeting #63, R1-106450, Nov. 2010, 93 pages.

(Continued)

*Primary Examiner* — Ajit Patel
*Assistant Examiner* — Richard Schnell
(74) *Attorney, Agent, or Firm* — Lee Hong Degerman Kang Waimey

(57) ABSTRACT

Provided is a method of transmitting ACK/NACK in a TDD-based wireless communication system. The method includes: receiving M downlink subframes associated with an uplink subframe n in each of two serving cells; determining four candidate resources based on the M downlink subframes received in each of the two serving cells; and transmitting an ACK/NACK response for the M downlink subframes by using one resource selected from the four candidate resources in the uplink subframe n, wherein the two serving cells includes a first serving cell and a second serving cell, and wherein among the four candidate resources, a first resource and a second resource are associated with a PDSCH or a SPS release PDCCH for releasing semi-persistent scheduling received in the first serving cell, and a third resource and a fourth resources are associated with a PDSCH received in the second serving cell.

6 Claims, 16 Drawing Sheets

Related U.S. Application Data

(60) Provisional application No. 61/422,639, filed on Dec. 13, 2010, provisional application No. 61/423,570, filed on Dec. 15, 2010, provisional application No. 61/425,736, filed on Dec. 21, 2010, provisional application No. 61/433,897, filed on Jan. 18, 2011.

(51) Int. Cl.
| | |
|---|---|
| *H04L 1/18* | (2006.01) |
| *H04L 1/16* | (2006.01) |
| *H04J 3/16* | (2006.01) |
| *H04W 72/04* | (2009.01) |
| *H04L 5/14* | (2006.01) |

(52) U.S. Cl.
CPC .......... *H04L 1/1621* (2013.01); *H04L 1/1635* (2013.01); *H04L 1/1861* (2013.01); *H04L 5/001* (2013.01); *H04L 5/0053* (2013.01); *H04L 5/14* (2013.01); *H04W 72/042* (2013.01); *H04W 72/0446* (2013.01)

(56) References Cited

U.S. PATENT DOCUMENTS

| | | | |
|---|---|---|---|
| 2011/0090825 A1* | 4/2011 | Papasakellariou | H04L 1/06 370/280 |
| 2011/0243066 A1 | 10/2011 | Nayeb Nazar et al. | |
| 2011/0280164 A1* | 11/2011 | Luo | H04L 5/001 370/281 |
| 2012/0082157 A1 | 4/2012 | Yamada et al. | |
| 2013/0265914 A1 | 10/2013 | Ahn et al. | |
| 2016/0127068 A1 | 5/2016 | Ahn et al. | |
| 2017/0237540 A1 | 8/2017 | Ahn et al. | |

FOREIGN PATENT DOCUMENTS

| | | |
|---|---|---|
| JP | 2007528662 | 10/2007 |
| JP | 2011-527531 | 10/2011 |
| JP | 2012-528502 | 11/2012 |
| KR | 10-2002-0075647 | 10/2002 |
| KR | 10-2010-0074328 | 7/2010 |

OTHER PUBLICATIONS

Huawei, et al., "Determination of PUSCH A/N codebook size for TDD," 3GPP TSG RAN WG1 Meeting #65, R1-112010, May 2011, 13 pages.

The State Intellectual Property Office of the People's Republic of China Application Serial No. 201180059940.2, Office Action dated Apr. 15, 2015, 8 pages.

Motorola Mobility, "Corrections to Rel-10 LTE-Advanced features in 36.213," 3GPP TSG-RAN Meeting #64, R1-111216, Feb. 2011, 111 pages.

Samsung, "DAI design for LTE-A TDD," 3GPP TSG RAN WG1 meeting #60, R1-101143, Feb. 2010, 4 pages.

Huawei, et al., "Remaining details on HARQ-ACK procedure with PUCCH format 3 for TDD," 3GPP TSG RAN WG1 Meeting #65, R1-111241, May 2011, 5 pages.

Japan Patent Office Application Serial No. 2014-175624, Office Action dated Jul. 14, 2015, 4 pages.

Fujitsu, "Channel Selection for A/N feedback in CA," 3GPP TSG-RAN1 #62, R1-104875, Aug. 2010, 5 pages.

LG Electronics, "Resource allocation for ACK/NACK mode b in TDD," 3GPP TSG RAN WG1 #63bis, R1-110368, Jan. 2011, 4 pages.

Japan Patent Office Application Serial No. 2013-543108, Office Action dated Jul. 8, 2014, 3 pages.

Korean Intellectual Property Office Application Serial No. 10-2013-7013513, Notice of Allowance dated Sep. 24, 2014, 2 pages.

Japan Patent Office Application No. 2016-053654, Office Action dated Dec. 20, 2016, 2 pages.

LG Electronics, "Uplink ACK/NACK transmission in LTE-Advanced", R1-094163, 3GPP TSG RAN WG1 #58bis, Oct. 2009, 6 pages.

LG Electronics, "ACK/NACK on PUCCH for TDD", R1-106099, 3GPP TSG RAN WG1 Meeting #63, Nov. 2010, 13 pages.

Panasonic, "Mapping Tables for Format 1b with Channel Selection", R1-105476, 3GPP TSG RAN WG1 Meeting #62bis, Oct. 2010, 7 pages.

Catt, "DAI Design for LTE-A", R1-104311, 3GPP TSG RAN WG1 Meeting #62, Aug. 2010, 4 pages.

Nokia Siemens Networks et al., "Remaining details for PUCCH A/N (FDD)", R1-106193, 3GPP TSG RAN WG1 Meeting #63, Nov. 2010, 6 pages.

State Intellectual Property Office of the People's Republic of China Application Serial No. 201510901351.4, Office Action dated Apr. 2, 2018, 5 pages.

European Patent Office Application Serial No. 11849808.8, Search Report dated Jan. 18, 2018, 8 pages.

Catt, "Resource Allocation for PUCCH Format 3", 3GPP TSG RAN WG1 Meeting #62bis, R1-105153, Oct. 2010, 3 pages.

Qualcomm, "PUCCH resources for multi-bit ACK", 3GPP TSG RAN WG1 Meeting #62bis, R1-105557, Oct. 2010, 3 pages.

* cited by examiner

METHOD AND APPARATUS FOR TRANSMITTING ACK/NACK IN A WIRELESS COMMUNICATION SYSTEM BASED ON TDD

CROSS-REFERENCE TO RELATED APPLICATIONS

This application is a continuation of U.S. patent application Ser. No. 15/583,779, filed on May 1, 2017, now U.S. Pat. No. 10,305,663, which is a continuation of U.S. patent application Ser. No. 14/991,754, filed on Jan. 8, 2016, now U.S. Pat. No. 9,680,589, which is a continuation of U.S. patent application Ser. No. 13/992,896, filed on Jun. 10, 2013, now U.S. Pat. No. 9,270,399, which is the National Stage filing under 35 U.S.C. 371 of International Application No. PCT/KR2011/009529, filed on Dec. 12, 2011, which claims the benefit of U.S. Provisional Application No. 61/422,639, filed on Dec. 13, 2010, 61/423,570, filed on Dec. 15, 2010, 61/425,736, filed on Dec. 21, 2010, and 61/433,897, filed on Jan. 18, 2011, the contents of which are all hereby incorporated by reference herein in their entirety.

TECHNICAL FIELD

The present invention relates to wireless communications, and more particularly, to a method and apparatus for transmitting reception acknowledgement for a hybrid automatic repeat request (HARQ) in a time division duplex (TDD)-based wireless communication system.

BACKGROUND ART

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of an uplink control signal such as a hybrid automatic repeat request (HARQ) positive-acknowledgement (ACK)/negative-acknowledgement (NACK) signal, a channel quality indicator (CQI), and a scheduling request (SR).

Meanwhile, 3GPP LTE-advanced (LTE-A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells.

A time division duplex (TDD) system uses the same frequency in downlink and uplink cases. Therefore, one or more downlink subframes are associated with an uplink subframe. The 'association' implies that transmission/reception in the downlink subframe is associated with transmission/reception in the uplink subframe. For example, when a transport block is received in a plurality of downlink subframes, the user equipment transmits HARQ ACK/NACK for the transport block in the uplink subframe associated with the plurality of downlink subframes.

As a plurality of serving cells are introduced in the TDD system, an information amount of HARQ ACK/NACK is increased. Channel selection is one of methods for transmitting the increased HARQ ACK/NACK with a limited transmission bit. The channel selection is a method of allocating a plurality of radio resources and transmitting a modulated symbol by using any one of the plurality of radio resources. A variety of HARQ ACK/NACK information can be represented according to a signal constellation of a modulated symbol and a radio resource.

Accordingly, there is a need for a method of allocating a resource to apply such a channel selection to a multiple carrier system supporting a plurality of serving cells.

SUMMARY OF INVENTION

Technical Problem

The present invention provides a positive-acknowledgement (ACK)/negative-acknowledgement (NACK) transmission method and apparatus in a time division duplex (TDD)-based wireless communication system.

Technical Solution

According to an aspect of the present invention, a method of transmitting positive-acknowledgement (ACK)/negative-acknowledgement (NACK) in a time division duplex (TDD)-based wireless communication system in which M (M>2) downlink subframes are associated with an uplink subframe in each of two serving cells is provided. The method includes: receiving M downlink subframes associated with an uplink subframe n in each of the two serving cells; determining four candidate resources on the basis of the M downlink subframes received in each of the two serving cells; and transmitting an ACK/NACK response for the M downlink subframes received in each of the two serving cells by using one resource selected from the four candidate resources in the uplink subframe n, wherein the two serving cells consist of a first serving cell and a second serving cell, and wherein among the four candidate resources, a first resource and a second resource are related to a physical downlink shared channel (PDSCH) received in the first serving cell or a semi-persistent scheduling (SPS) release PDCCH for releasing semi-persistent scheduling, and a third resource and a fourth resources are related to a PDSCH received in the second serving cell.

In the aforementioned aspect of the present invention, at least one downlink subframe among the M downlink subframes received in the first serving cell may include a PDCCH for transmitting a downlink grant and a physical downlink shared channel (PDSCH) corresponding to the PDCCH.

In addition, the downlink grant may include a downlink assignment index (DAI) indicating an accumulative counter value of the PDCCH which transmits a PDSCH allocated thereto.

In addition, in the M downlink subframes received in the first serving cell, if a PDSCH indicated by detecting a first PDCCH of which a DAI value is 1 or a second PDCCH of which a DAI value is 2 is received, or if a first SPS release PDCCH of which a DAI value is 1 or a second SPS release PDCCH of which a DAI value is 2 is received, among the four candidate resources, the first resource may be determined based on a first control channel element (CCE) used in transmission of the first PDCCH or the first SPS release PDCCH, and the second resource may be determined based on a first CCE used in the second PDCCH or to the second SPS release PDCCH.

In addition, if an SPS PDSCH not having a corresponding PDCCH is received in the M downlink subframes received in the first serving cell, the first resource among the four candidate resources may be one resource selected from four resources configured by using a higher layer signal, and the selected one resource may be indicated by an uplink transmit power control field of a PDCCH indicating activation of semi-persistent scheduling.

In addition, in the M downlink subframes received in the first serving cell, if a PDSCH indicated by detecting a first PDCCH of which a DAI value is 1 or receiving a first SPS release PDCCH of which a DAI value is 1 is received, or if a first SPS release PDCCH of which a DAI value is 1 is received, the second resource among the four candidate resources may be determined based on a first CCE used in transmission of the first PDCCH or the first SPS release PDCCH.

In addition, if a third PDCCH of which a DAI value is 1 and a fourth PDCCH of which a DAI value is 2 is received in the M downlink subframes received in the first serving cell, and if a PDSCH indicated by detecting the third PDCCH or the fourth PDCCH is received in the M downlink subframes received in the second serving cell, among the four candidate resources, a third resource may be determined based on a first CCE used in transmission of the third PDCCH, and a fourth resource may be determined based on a first CCE used in transmission of the fourth PDCCH.

In addition, if at least one PDCCH is received in the M downlink subframes received in the second serving cell and a PDSCH indicated by detecting the at least one PDCCH is received in the second serving cell, among the four candidate resources, a third resource and a fourth resource may be selected from four resources configured by using a higher layer signal, and the selected resources may be indicated by an uplink transmit power control field included in the at least one PDCCH.

Advantageous Effects

The present invention provides a method of transmitting reception acknowledgement in a time division duplex (TDD) system supporting a plurality of serving cells. Therefore, positive-acknowledgement (ACK)/negative-acknowledgement (NACK) mismatch between a base station and a user equipment can be decreased.

MODE FOR INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
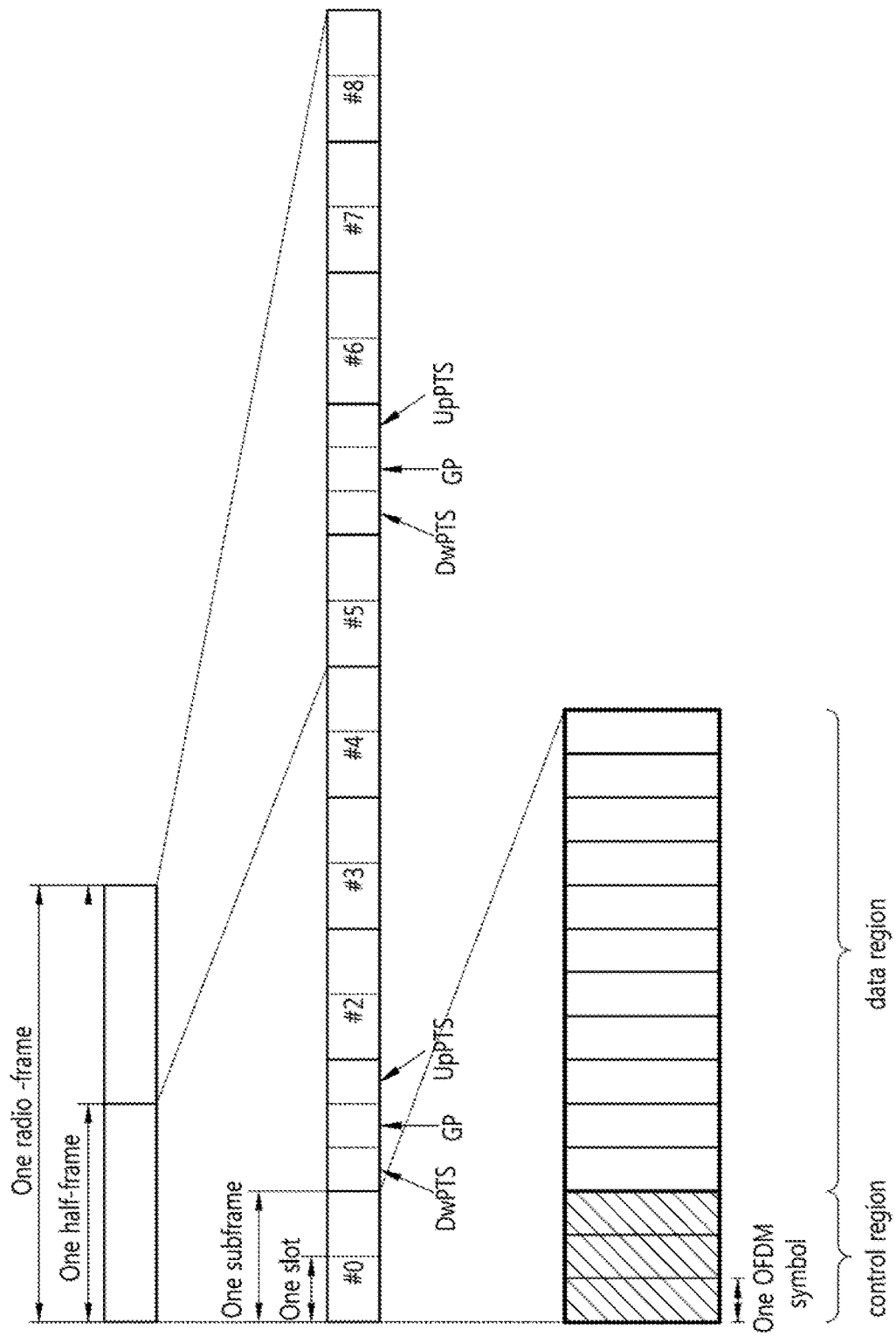
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 4 of 3GPP TS 36.211 V8.7.0 (2009-05) "Evolved Universal Terrestrial Radio Access (E-UTRA); Physical Channels and Modulation (Release 8)" may be incorporated herein by reference for time division duplex (TDD).

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe co-exist in one radio frame. Table 1 shows an example of a configuration of the radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH. Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDSCH, indicated by the PDCCH, is referred to as a system information block (SIB).

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
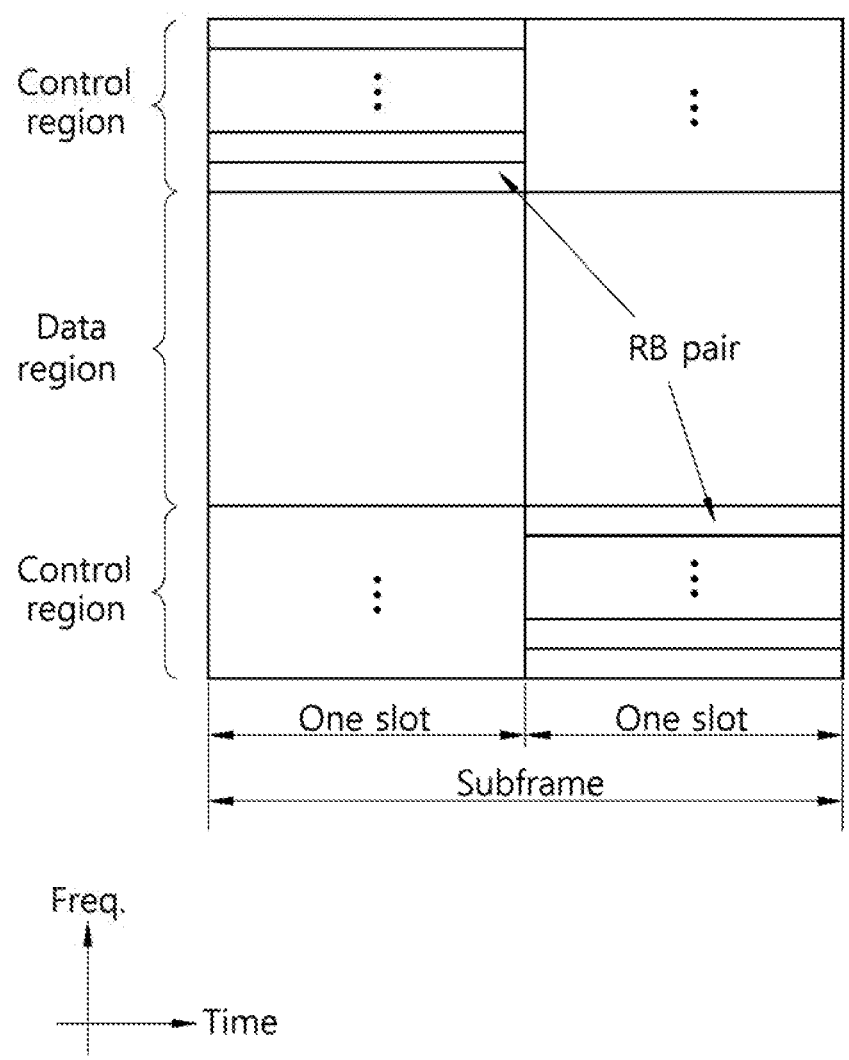
FIG. 2 shows an example of an uplink subframe in 3GPP LTE.

FIG. 2 shows an example of a UL subframe in 3GPP LTE.

The UL subframe can be divided into a control region and a data region in a frequency domain. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

Table 2 below shows an example of a modulation scheme and the number of bits per subframe according to the PUCCH format.

TABLE 2

| PUCCH format | Modulation scheme | Number of bits per subframe |
|---|---|---|
| 1 | N/A | N/A |
| 1a | BPSK | 1 |
| 1b | QPSK | 2 |

TABLE 2-continued

| PUCCH format | Modulation scheme | Number of bits per subframe |
|---|---|---|
| 2 | QPSK | 20 |
| 2a | QPSK + BPSK | 21 |
| 2b | QPSK + QPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n) = e^{jb(n)\pi/4} \quad [\text{Equation 1}]$$

In Equation 1, u denotes a root index, and n denotes a component index in the range of $0 \leq n \leq N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence $r(n, I_{cs})$ $$r(n, I_{cs}) = r(n) \cdot \exp\left(\frac{j2\pi I_{cs} n}{N}\right), \quad [\text{Equation 2}]$$
$$0 \leq I_{cs} \leq N-1$$

In Equation 2, $I_{cs}$ denotes a CS index indicating a CS amount ($0 \leq I_{cs} \leq N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in the PUCCH format 1b will be described.

Figure 3:
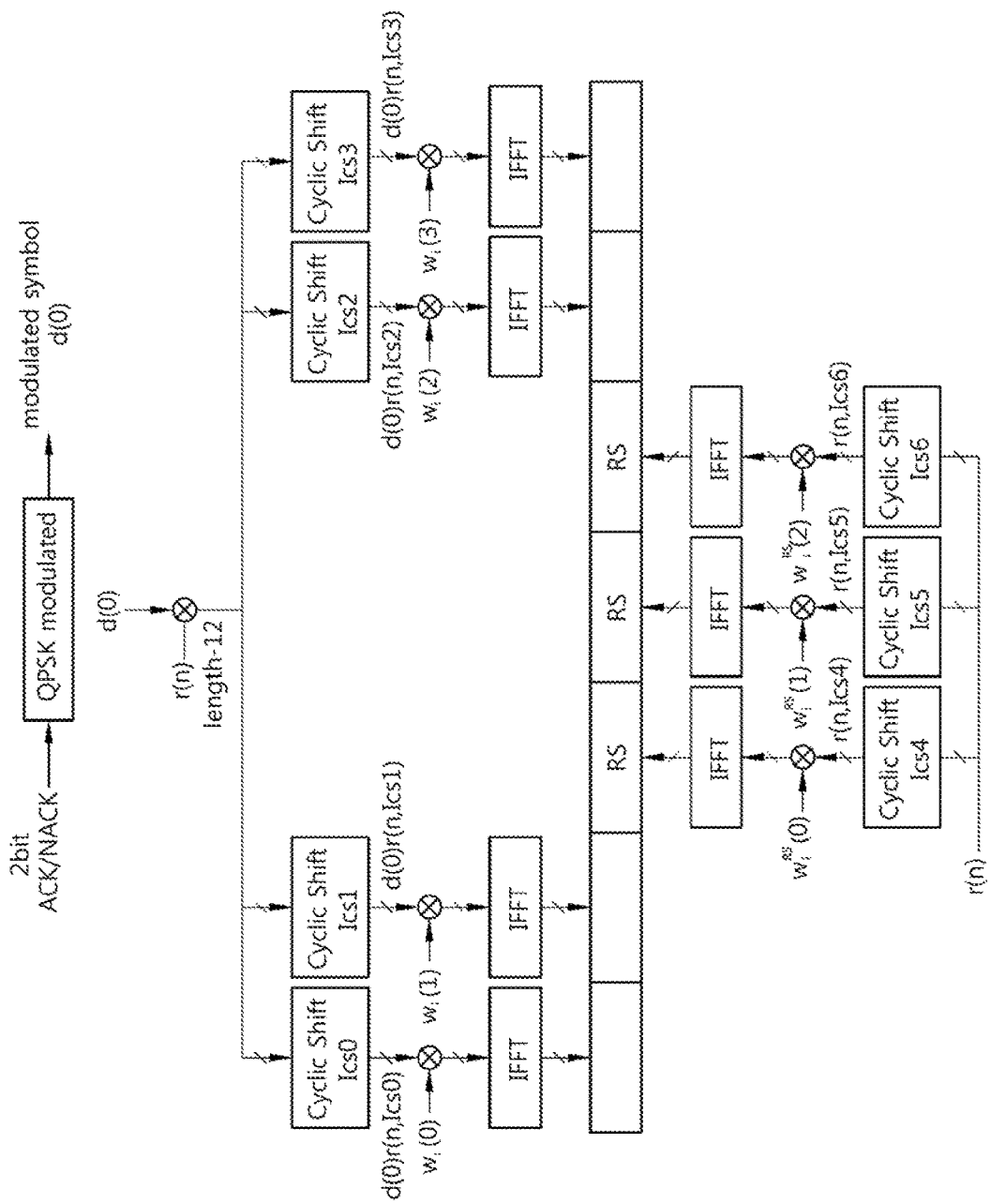
FIG. 3 shows a physical uplink control channel (PUCCH) format 1 b in a normal cyclic prefix (CP) in 3GPP LTE.

FIG. 3 shows a PUCCH format 1 b in a normal CP in 3GPP LTE.

One slot includes 7 OFDM symbols. Three OFDM symbols are used as reference signal (RS) OFDM symbols for a reference signal. Four OFDM symbols are used as data OFDM symbols for an ACK/NACK signal.

In the PUCCH format 1 b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index I in a slot.

In the normal CP, there are four data OFDM symbols for transmission of an ACK/NACK signal in one slot. It is assumed that CS indices mapped to the respective data OFDM symbols are denoted by $I_{cs0}$, $I_{cs2}$, and $I_{cs3}$.

The modulation symbol d(0) is spread to a cyclically shifted sequence $r(n, I_{cs})$. When a one-dimensionally spread sequence mapped to an $(i+1)^{th}$ OFDM symbol in a subframe is denoted by m(i), it can be expressed as follows.

$$\{M(0), m(1), m(2), m(3)\} = \{d(0)r(n, I_{cs0}), d(0)r(n, I_{cs1}), d(0)r(n, I_{cs2}), d(0)r(n, I_{cs3})\}$$

In order to increase UE capacity, the one-dimensionally spread sequence can be spread by using an orthogonal sequence. An orthogonal sequence $w_i(k)$ (where i is a sequence index, $0 \leq k \leq K-1$) having a spreading factor K=4 uses the following sequence.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spreading factor K=3 uses the following sequence.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used for each slot.

Therefore, when any orthogonal sequence index i is given, a two-dimensionally spread sequences {s(0), s(1), s(2), s(3)} can be expressed as follows.

$$\{s(0), s(1), s(2), s(3)\} = \{w_i(0)m(0), w_i(1)m(1), w_i(2)m(2), w_i(3)m(3)\}$$

The two-dimensionally spread sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal for the PUCCH format 1 b is also transmitted by cyclically shifting the base sequence r(n) and then by spreading it by the use of an orthogonal sequence. When CS indices mapped to three RS OFDM symbols are denoted by $I_{cs4}$, $I_{cs5}$, and $I_{cs6}$, three cyclically shifted sequences $r(n, I_{cs4})$, $r(n, I_{cs5})$, and $r(n, I_{cs6})$ can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed with one resource block.

In the 3GPP LTE, a resource index $n^{(1)}_{PUCCH}$ is defined in order for the UE to obtain the three parameters for configuring the PUCCH. The resource index $n^{(1)}_{PUCCH}$ is defined to $n_{CCE}+N^{(1)}_{PUCCH}$, where $n_{CCE}$ is an index of a first CCE used for transmission of corresponding DCI (i.e., DL resource allocation used to receive DL data mapped to an ACK/NACK signal), and $N^{(1)}_{PUCCH}$ is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index i, a CS index $I_{cs}$, a resource block index m, and an index for obtaining the three indices. The ACK/NACK resource may include at least one of an orthogonal sequence, a cyclic shift, a resource block, and a combination thereof.

Figure 4:
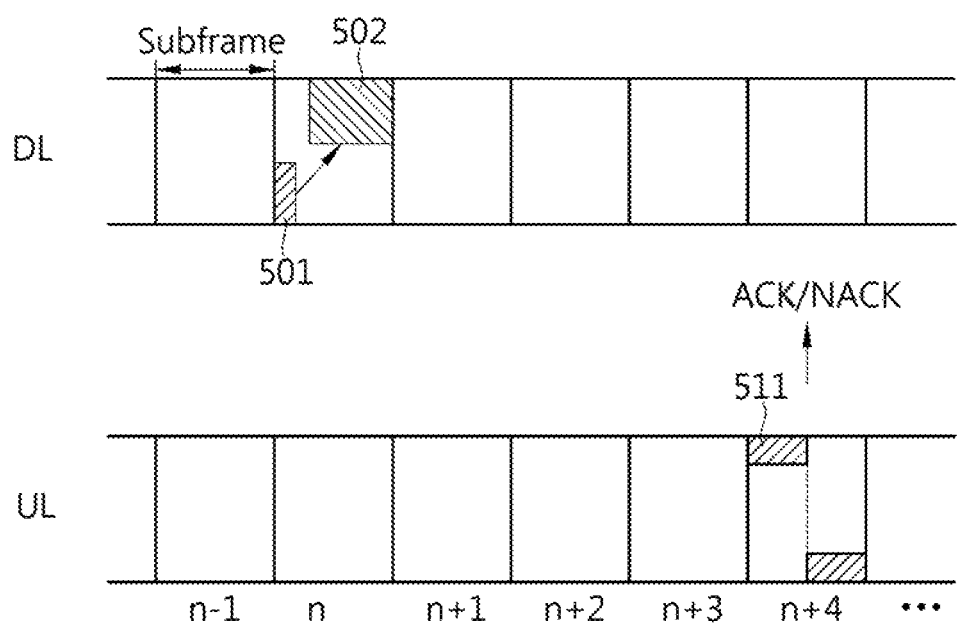
FIG. 4 shows an example of performing hybrid automatic repeat request (HARQ).

FIG. 4 shows an example of performing HARQ.

By monitoring a PDCCH, a UE receives a DL grant including a DL resource allocation on a PDCCH 501 in an $n^{th}$ DL subframe. The UE receives a DL transport block through a PDSCH 502 indicated by the DL resource allocation.

The UE transmits an ACK/NACK response for the DL transport block on a PUCCH 511 in an $(n+4)^{th}$ UL subframe. The ACK/NACK response can be regarded as a reception acknowledgement for the DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In the 3GPP LTE, to configure a resource index of the PUCCH 511, the UE uses a resource allocation of the PDCCH 501. That is, a lowest CCE index (or an index of a first CCE) used for transmission of the PDCCH 501 is $n_{CCE}$, and the resource index is determined as $n^{(1)}_{PUCCH}=n_{CCE}+N^{(1)}_{PUCCH}$.

Now, ACK/NACK transmission for HARQ in 3GPP LTE time division duplex (TDD) will be described.

A UL subframe and a DL subframe coexist in one radio frame in the TDD, unlike in frequency division duplex (FDD). In general, the number of UL subframes is less than the number of DL subframes. Therefore, in preparation for a case in which the UL subframes for transmitting an ACK/NACK signal are insufficient, it is supported that a plurality of ACK/NACK signals for a plurality of DL transport blocks are transmitted in one UL subframe.

According to the section 10.1 of 3GPP TS 36.213 V8.7.0 (2009-05), two ACK/NACK modes, i.e., channel selection and bundling, are introduced.

First, the bundling is an operation in which, if all of PDSCHs (i.e., DL transport blocks) received by a UE are successfully decoded, ACK is transmitted, and otherwise NACK is transmitted. This is called an AND operation.

However, the bundling is not limited to the AND operation, and may include various operations for compressing ACK/NACK bits corresponding to a plurality of transport blocks (or codewords). For example, the bundling may indicate a counter value indicating the number of ACKs (or NACKs) or the number of consecutive ACKs.

Second, the channel selection is also called ACK/NACK multiplexing. The UE transmits the ACK/NACK by selecting one of a plurality of PUCCH resources.

Table 5 below shows a DL subframe n-k associated with a UL subframe n depending on the UL-DL configuration in 3GPP LTE. Herein, k∈K, where M is the number of elements of a set K.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Assume that M DL subframes are associated with a UL subframe n, where M=3. Since 3 PDCCHs can be received from 3 DL subframes, the UE can acquire 3 PUCCH resources $n^{(1)}_{PUCCH,0}$, $n^{(1)}_{PUCCH,1}$, $n^{(1)}_{PUCCH,2}$. An example of channel selection is shown in Table 6 below.

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe or a corresponding PDCCH cannot be detected. In Table 6 above, there are three PUCCH resources $n^{(1)}_{PUCCH,0}$, $n^{(1)}_{PUCCH,1}$, and $n^{(1)}_{PUCCH,2}$, and b(0) and b(1) are 2 bits transmitted by using a selected PUCCH.

For example, if the UE successfully receives three DL transport blocks in three DL subframes, the UE transmits bits (1,1) through the PUCCH by using $n^{(1)}_{PUCCH}$. If the UE fails to decode the DL transport block and successfully decodes the remaining transport blocks in a $1^{st}$ (i=0) DL subframe, the UE transmits bits (0, 1) through the PUCCH by using $n^{(1)}_{PUCCH,2}$.

In channel selection, NACK and DTX are coupled if at least one ACK exists. This is because a combination of a reserved PUCCH resource and a QPSK symbol is not enough to express all ACK/NACK states. However, if the ACK does not exist, the DTX and the NACK are decoupled.

The conventional PUCCH format 1b can transmit only 2-bit ACK/NACK. However, channel selection is used to express more ACK/NACK states by linking the allocated PUCCH resources and an actual ACK/NACK signal.

Meanwhile, if it is assumed that M DL subframes are associated with a UL subframe n, ACK/NACK may be mismatched between the BS and the UE due to missing of the DL subframe (or PDCCH).

Assume that M=3, and the BS transmits three DL transport blocks through three DL subframes. The UE misses the PDCCH in the $2^{nd}$ DL subframe and thus cannot receive a $2^{nd}$ transport block at all, and can receive only the remaining $1^{st}$ and $3^{rd}$ transport blocks. In this case, if bundling is used, the UE erroneously transmits ACK.

In order to solve this error, a downlink assignment index (DAI) is included in a DL grant on the PDCCH. The DAI indicates an accumulative counter value of the PDCCH which is related to a transmission of a PDSCH. A value of the 2-bit DAI is sequentially increased from 1, and a modulo-4 operation is applicable again from DAI=4. If M=5 and all of 5 DL subframes are scheduled, the DAI can be included in a corresponding PDCCH in the order of DAI=1, 2, 3, 4, 1.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (also referred to as bandwidth aggregation or carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC can be mapped to one cell. Therefore, when a UE communicates with a BS through a plurality of DL CCs, it can be said that the UE receives a service from a plurality of serving cells.

Figure 5:
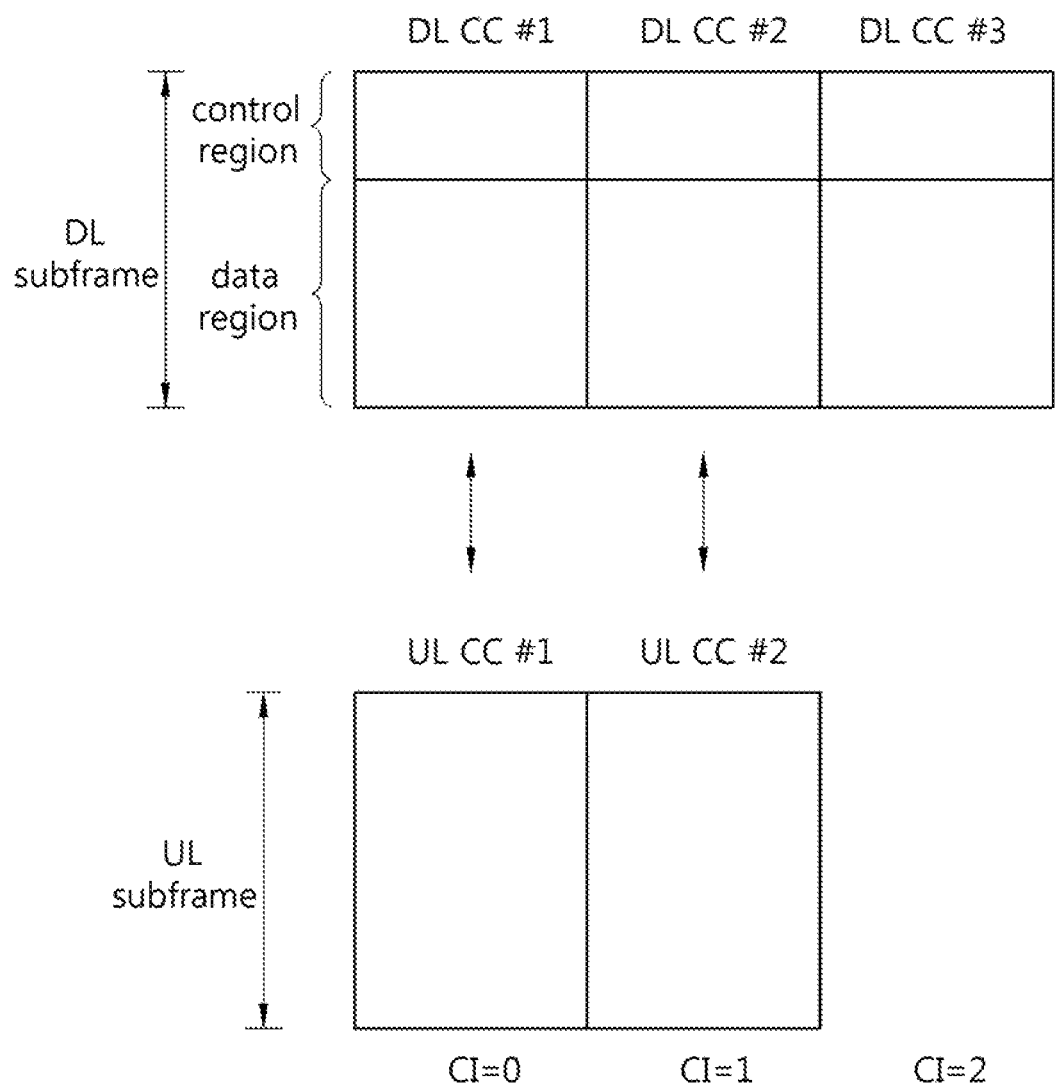
FIG. 5 shows an example of multiple carriers.

FIG. 5 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CCs. The UE can transmit a plurality of UL transport blocks simultaneously via a plurality of UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by using higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

The multiple carrier system can support non-cross carrier scheduling and cross carrier scheduling.

The non-cross carrier scheduling is a scheduling method in which a PDSCH and a PDCCH for scheduling the PDSCH are transmitted via the same DL CC. In addition, a DL CC in which a PDCCH for scheduling a PUSCH and a UL CC in which the PUSCH is transmitted are basically linked CCs in this scheduling method.

The cross-carrier scheduling is a scheduling method capable of performing resource allocation of a PDSCH transmitted by using a different carrier through a PDCCH transmitted via a specific CC. In addition, the cross-carrier scheduling is a scheduling method capable of performing resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. In a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

In cross-carrier scheduling, a BS can determine a PDCCH monitoring DL CC set. The PDCCH monitoring DL CC set consists of some DL CCs among all aggregated DL CCs. When the cross-carrier scheduling is configured, a UE performs PDCCH monitoring/decoding only for a DL CC included in the PDCCH monitoring DL CC set. The PDCCH monitoring DL CC set can be determined in a UE-specific, UE group-specific, or cell-specific manner.

Figure 6:
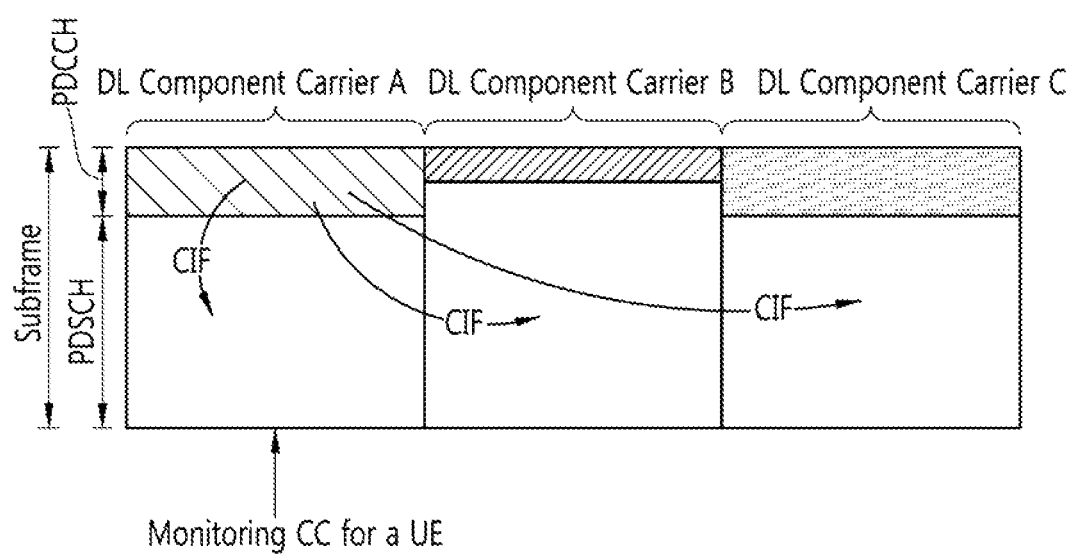
FIG. 6 shows an example of cross-carrier scheduling in a multiple carrier system.

FIG. 6 shows an example of cross-carrier scheduling in a multiple carrier system.

Referring to FIG. 6, 3 DL CCs (i.e., DL CC A, DL CC B, DL CC C) are aggregated, and the DL CC A is determined as the PDCCH monitoring DL CC. The UE can receive a DL grant for a PDSCH of the DL CC A, the DL CC B, and the DL CC C through the PDCCH. A CIF may be included in DCI transmitted through the PDCCH of the DL CC A to indicate a specific DL CC for which the DCI is provided.

Now, semi-persistent scheduling (SPS) will be described.

In general, a UE first receives a DL grant on a PDCCH, and subsequently receives a transport block through a PDSCH indicated by the DL grant. This implies that PDCCH monitoring is accompanied in every transport block, which is called dynamic scheduling.

The SPS pre-defines a PDSCH resource, and the UE receives a transport block through the pre-defined resource without PDCCH monitoring.

Figure 7:
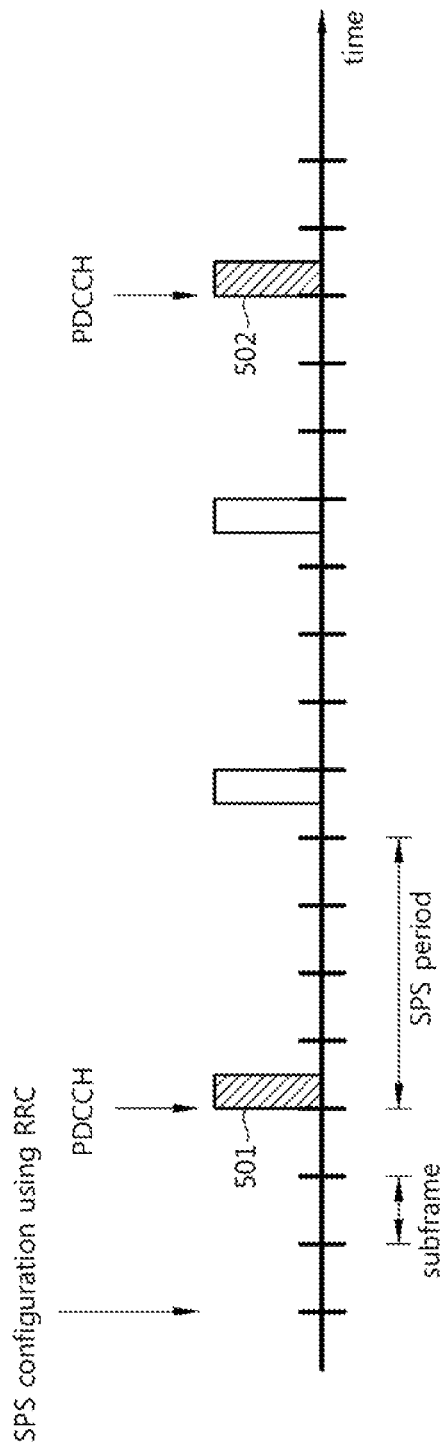
FIG. 7 shows an example of semi-persistent scheduling (SPS) in 3GPP LTE.

FIG. 7 shows an example of SPS in 3GPP LTE. Although DL SPS is shown herein, the same is also applicable to UL SPS.

First, a BS sends an SPS configuration to a UE by using radio resource control (RRC). The SPS configuration includes an SPS-C-RNTI and an SPS period. It is assumed herein that the SPS period is four subframes.

Even if the SPS is configured, the SPS is not immediately performed. The UE monitors a PDCCH 501 in which a CRC is masked with the SPS-C-RNTI, and performs the SPS after the SPS is activated. When NDI=0 is included in DCI on the PDCCH 501, combinations of values of several fields (e.g., a transmit power command (TPC), a cyclic shift (CS) of a demodulation reference signal (DMSR), a modulation and coding scheme (MCS), a redundancy version (RV), an HARQ process number, and a resource allocation) included in the DCI are used in SPS activation and deactivation.

When the SPS is activated, even if a DL grant on the PDCCH is not received, the UE receives a transport block on a PDSCH at an SPS period. The PDSCH received without the PDCCH is called an SPS PDSCH. The PDCCH for deactivating the SPS is called an SPS release PDCCH.

Thereafter, the UE monitors a PDCCH 502 in which a CRC is masked with the SPS-C-RNTI, and confirms deactivation of the SPS.

According to 3GPP LTE, the PDCCH indicating the activation of the SPS does not require an ACK/NACK response, but the SPS release PDCCH indicating the deactivation of the SPS requires the ACK/NACK response. Hereinafter, a DL transport block may include the SPS release PDCCH.

According to the conventional PUCCH formats 1a/1b, a resource index $n^{(1)}_{PUCCH}$ is acquired from the PDCCH. However, according to the SPS, the PDCCH associated with the PDSCH is not received, and thus a pre-assigned resource index is used.

Now, ACK/NACK transmission in a TDD system according to the present invention will be described.

An ACK/NACK state for HARQ indicates one of the following three states.

ACK: a decoding success of a transport block received on a PDSCH.

NACK: a decoding failure of the transport block received on the PDSCH.

DTX: a failure in the reception of the transport block on the PDSCH. In case of dynamic scheduling, a failure in the reception of a PDCCH.

As shown in Table 5, the M DL subframes are associated with the UL subframe n according to the UL-DL configuration. In addition, in the multiple carrier system, M DL subframes in each of a plurality of DL CCs can be associated with a UL subframe n of one UL CC. In this case, the number of bits that can be transmitted in a UL subframe n in which ACK/NACK is transmitted may be less than the number of bits for expressing all ACK/NACK states for a plurality of DL subframes. Therefore, in order to express the ACK/NACK by using a smaller number of bits, an ACK/NACK multiplexing method can be considered as follows.

(1) Bundled ACK counter: A UE can deliver an ACK counter value to a BS only when data received in each DL CC is transmitted without DTX and is all confirmed as ACK. That is, the UE delivers the ACK counter value as '0' when even one piece of received data is confirmed as NACK or DTX. By using a received DAI value, the UE can know a counter value of a PDSCH (excluding an SPS PDSCH) for which ACK/NACK is transmitted.

Figure 8:
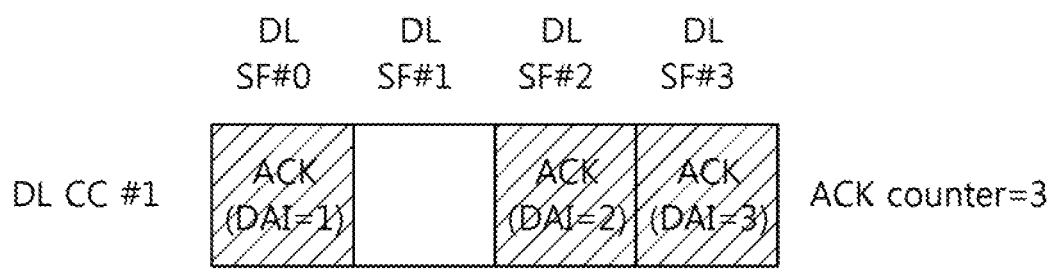
FIG. 8 shows an example of a method of using a bundled positive-acknowledgement (ACK) counter.
Figure 8:
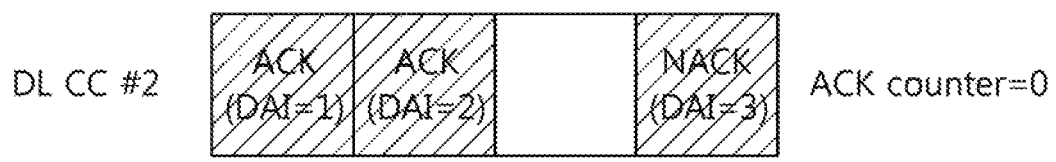
Figure 8:
Figure 8:

FIG. 8 shows an example of a method of using a bundled ACK counter.

Referring to FIG. 8, a DL CC #1 and a DL CC #2 are assigned to a UE. In the DL CC #1, if data is received in DL subframes #0, 2, and 3 and is all confirmed as ACK, the UE transmits information indicating that an ACK counter value is 3. On the other hand, in the DL CC #2, data is received in DL subframes #0, 1, and 3 and data received in the DL subframe #3 is confirmed as NACK. Therefore, the UE transmits information indicating that the ACK counter value is 0.

(2) Consecutive ACK counter: The UE can deliver an accumulative ACK counter value for subframes which are transmitted without DTX and which are consecutively confirmed as ACK, starting from a first subframe in M subframes of each DL CC.

Figure 9:
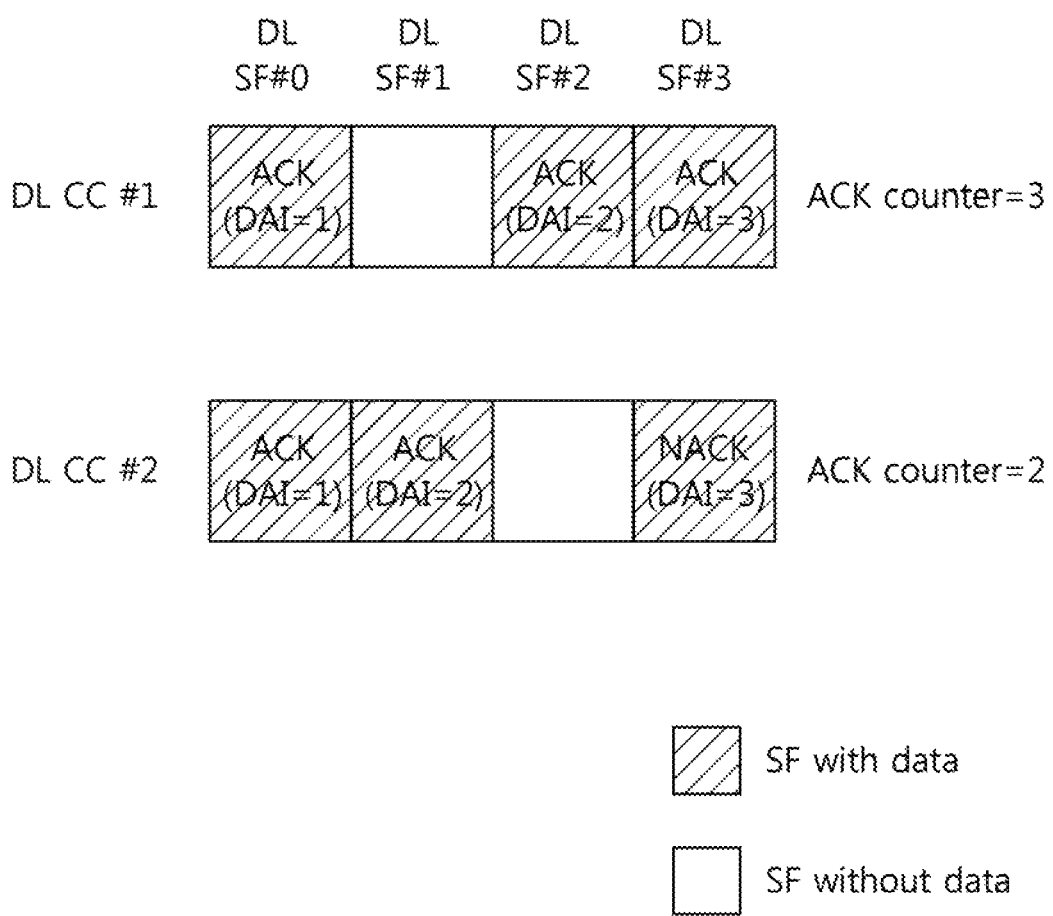
FIG. 9 shows an example of a method of using a consecutive ACK counter.

FIG. 9 shows an example of a method of using a consecutive ACK counter.

Referring to FIG. 9, a DL CC #1 and a DL CC #2 are assigned to a UE. The UE receives data in DL subframes #0, 2, and 3 of the DL CC #1, and three pieces of data are confirmed as data transmitted without DTX and is consecutively confirmed as ACK. In this case, the UE transmits an accumulative ACK counter value, i.e., 3, as a value indicating the ACK counter value.

On the other hand, data is received in DL subframes #0, 1, and 2 of the DL CC #2, and data received in the DL subframes #0 and 1 is successfully decoded and thus is confirmed as ACK, whereas data received in the DL subframe #3 is confirmed as NACK. In this case, since two pieces of data are consecutively confirmed as ACK, the accumulative ACK counter value, i.e., 2, is transmitted as an ACK counter value. Hereinafter, it is assumed in the present invention that a consecutive ACK counter is used. That is, a transmission method in which TDD HARQ-ACK is multiplexed by using a TDD system, two serving cells, a consecutive ACK counter, and a PUCCH format 1b using channel selection is exemplified herein. However, the present invention is not limited thereto. That is, the present invention can be generally applied when channel selection is used in a TDD system which aggregates two serving cells.

In order to effectively deliver per-DL CC ACK counter value information, a channel selection method can be used. For the channel selection, a per-DL CC ACK counter value can be mapped to a state of Table 7 below. The state includes 2-bit information.

TABLE 7

| ACK counter value | State (B0, B1) or (B2, B3) |
| --- | --- |
| 0 | N, N or D, D |
| 1 | A, N |
| 2 | N, A |
| 3 | A, A |
| 4 | A, N |
| 5 | N, A |
| 6 | A, A |
| 7 | A, N |
| 8 | N, A |
| 9 | A, A |

For example, assume that a DL CC #1 and a DL CC #2 are assigned to a UE, and M DL subframes linked to one UL subframe are 3 in number (i.e., M=3). In this case, if three consecutive ACKs are generated in the DL CC #1 and two consecutive ACKs are generated in the DL CC #2, the UE maps an ACK counter value (B0, B1) for the DL CC #1 to a state {A, A}, and an ACK counter value (B1, B2) for the DL CC #2 is mapped to a state {N, A}.

Tables 8 and 9 below show a channel selection scheme used to deliver ACK counter value information.

TABLE 8

| B0 | B1 | B2 | B3 | Channel | constellation |
|---|---|---|---|---|---|
| D | N/D | N/D | N/D | NO TRANSMISSION | NO TRANSMISSION |
| N | N/D | N/D | N/D | H0 | 1 |
| A | N/D | N/D | N/D | H0 | −1 |
| N/D | A | N/D | N/D | H1 | −j |
| A | A | N/D | N/D | H1 | j |
| N/D | N/D | A | N/D | H2 | 1 |
| A | N/D | A | N/D | H2 | j |
| N/D | A | A | N/D | H2 | −j |
| A | A | A | N/D | H2 | −1 |
| N/D | N/D | N/D | A | H3 | 1 |
| A | N/D | N/D | A | H0 | −j |
| N/D | A | N/D | A | H3 | j |
| A | A | N/D | A | H0 | j |
| N/D | N/D | A | A | H3 | −j |
| A | N/D | A | A | H3 | −1 |
| N/D | A | A | A | H1 | 1 |
| A | A | A | A | H1 | −1 |

TABLE 9

| B0 | B1 | B2 | B3 | Channel | constellation |
|---|---|---|---|---|---|
| D | D | N/D | N/D | NO TRANSMISSION | NO TRANSMISSION |
| N | N | N/D | N/D | H0 | 1 |
| N | D | N/D | N/D | H0 | 1 |
| D | N | N/D | N/D | H0 | 1 |
| A | N/D | N/D | N/D | H0 | +j |
| N/D | A | N/D | N/D | H0 | −j |
| A | A | N/D | N/D | H0 | −1 |
| N/D | N/D | A | N/D | H3 | +j |
| A | N/D | A | N/D | H2 | 1 |
| N/D | A | A | N/D | H1 | 1 |

TABLE 9-continued

| B0 | B1 | B2 | B3 | Channel | constellation |
|---|---|---|---|---|---|
| A | A | A | N/D | H1 | +j |
| N/D | N/D | N/D | A | H3 | 1 |
| A | N/D | N/D | A | H2 | +j |
| N/D | A | N/D | A | H3 | −j |
| A | A | N/D | A | H2 | −1 |
| N/D | N/D | A | A | H3 | −1 |
| A | N/D | A | A | H2 | −j |
| N/D | A | A | A | H1 | −j |
| A | A | A | A | H1 | −1 |

In Tables 8 and 9, H0, H1, H2, and H3 denote a PUCCH resource $n^{(1)}_{PUCCH}$ for channel selection. That is, H0 denotes $n^{(1)}_{PUCCH,0}$ H1 denotes $n^{(1)}_{PUCCH,1}$, H2 denotes $n^{(1)}_{PUCCH,2}$, and H3 denotes $n^{(1)}_{PUCCH,3}$ (the same is applied hereinafter). In addition, in signal constellation, 1 indicates '00', −1 indicates '11', j indicates '10', and −j indicates '01'.

When H0 to H3 and signal constellation are expressed as described above, Table 8 above can be expressed as shown in Table 10 and Table 11 below. Table 10 shows a case of M=3, and Table 11 shows a case of M=4.

TABLE 10

| primary cell HARQ-ACK(0), HARQ-ACK(1), HARQ-ACK(2) | secondary cell HARQ-ACK(0), HARQ-ACK(1), HARQ-ACK(2) | resource $n^{(1)}_{PUCCH}$ | signal constellation b(0), b(1) |
|---|---|---|---|
| A, A, A | A, A, A | $n^{(1)}_{PUCCH,1}$ | 1, 1 |
| A, A, N/D | A, A, A | $n^{(1)}_{PUCCH,1}$ | 0, 0 |
| A, N/D, any | A, A, A | $n^{(1)}_{PUCCH,3}$ | 1, 1 |
| N/D, any, any | A, A, A | $n^{(1)}_{PUCCH,3}$ | 0, 1 |
| A, A, A | A, A, N/D | $n^{(1)}_{PUCCH,0}$ | 1, 0 |
| A, A, N/D | A, A, N/D | $n^{(1)}_{PUCCH,3}$ | 1, 0 |
| A, N/D, any | A, A, N/D | $n^{(1)}_{PUCCH,0}$ | 0, 1 |
| N/D, any, any | A, A, N/D | $n^{(1)}_{PUCCH,3}$ | 0, 0 |
| A, A, A | A, N/D, any | $n^{(1)}_{PUCCH,2}$ | 1, 1 |
| A, A, N/D | A, N/D, any | $n^{(1)}_{PUCCH,2}$ | 0, 1 |
| A, N/D, any | A, N/D, any | $n^{(1)}_{PUCCH,2}$ | 1, 0 |
| N/D, any, any | A, N/D, any | $n^{(1)}_{PUCCH,2}$ | 0, 0 |
| A, A, A | N/D, any, any | $n^{(1)}_{PUCCH,1}$ | 1, 0 |
| A, A, N/D | N/D, any, any | $n^{(1)}_{PUCCH,1}$ | 0, 1 |
| A, N/D, any | N/D, any, any | $n^{(1)}_{PUCCH,0}$ | 1, 1 |
| N/D, any, any | N/D, any, any | $n^{(1)}_{PUCCH,0}$ | 0, 0 |
| DTX, any, any | N/D, any, any | no transmission | |

TABLE 11

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) |
|---|---|---|---|
| ACK, ACK, ACK, NACK/DTX | ACK, ACK, ACK, NACK/DTX | $n_{PUCCH,1}^{(1)}$ | 1, 1 |
| ACK, ACK, NACK/DTX, any | ACK, ACK, ACK, NACK/DTX | $n_{PUCCH,1}^{(1)}$ | 0, 0 |
| ACK, DTX, DTX, DTX | ACK, ACK, ACK, NACK/DTX | $n_{PUCCH,3}^{(1)}$ | 1, 1 |
| ACK, ACK, ACK, ACK | ACK, ACK, ACK, NACK/DTX | $n_{PUCCH,3}^{(1)}$ | 1, 1 |
| NACK/DTX, any, any, any | ACK, ACK, ACK, NACK/DTX | $n_{PUCCH,3}^{(1)}$ | 0, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 |
| ACK, ACK, ACK, NACK/DTX | ACK, ACK, NACK/DTX, any | $n_{PUCCH,0}^{(1)}$ | 1, 0 |
| ACK, ACK, NACK/DTX, any | ACK, ACK, NACK/DTX, any | $n_{PUCCH,3}^{(1)}$ | 1, 0 |

TABLE 11-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) |
|---|---|---|---|
| ACK, DTX, DTX, DTX | ACK, ACK, NACK/DTX, any | $n_{PUCCH,0}^{(1)}$ | 0, 1 |
| ACK, ACK, ACK, ACK | ACK, ACK, NACK/DTX, any | $n_{PUCCH,0}^{(1)}$ | 0, 1 |
| NACK/DTX, any, any, any | ACK, ACK, NACK/DTX, any | $n_{PUCCH,3}^{(1)}$ | 0, 0 |
| (ACK, NACK/DTX, any, any), except for (ACK, DTX, DTX, DTX) | ACK, ACK, NACK/DTX, any | $n_{PUCCH,3}^{(1)}$ | 0, 0 |
| ACK, ACK, ACK, NACK/DTX | ACK, DTX, DTX, DTX | $n_{PUCCH,2}^{(1)}$ | 1, 1 |
| ACK, ACK, ACK, NACK/DTX | ACK, ACK, ACK, ACK | $n_{PUCCH,2}^{(1)}$ | 1, 1 |
| ACK, ACK, NACK/DTX, any | ACK, DTX, DTX, DTX | $n_{PUCCH,2}^{(1)}$ | 0, 1 |
| ACK, ACK, NACK/DTX, any | ACK, ACK, ACK, ACK | $n_{PUCCH,2}^{(1)}$ | 0, 1 |
| ACK, DTX, DTX, DTX | ACK, DTX, DTX, DTX | $n_{PUCCH,2}^{(1)}$ | 1, 0 |
| ACK, DTX, DTX, DTX | ACK, ACK, ACK, ACK | $n_{PUCCH,2}^{(1)}$ | 1, 0 |
| ACK, ACK, ACK, ACK | ACK, DTX, DTX, DTX | $n_{PUCCH,2}^{(1)}$ | 1, 0 |
| ACK, ACK, ACK, ACK | ACK, ACK, ACK, ACK | $n_{PUCCH,2}^{(1)}$ | 1, 0 |
| NACK/DTX, any, any, any | ACK, DTX, DTX, DTX | $n_{PUCCH,2}^{(1)}$ | 0, 0 |
| NACK/DTX, any, any, any | ACK, ACK, ACK, ACK | $n_{PUCCH,2}^{(1)}$ | 0, 0 |
| (ACK, NACK/DTX, any, any), except for (ACK, DTX, DTX, DTX) | ACK, DTX, DTX, DTX | $n_{PUCCH,2}^{(1)}$ | 0, 0 |
| (ACK, NACK/DTX, any, any), except for (ACK, DTX, DTX, DTX) | ACK, ACK, ACK, ACK | $n_{PUCCH,2}^{(1)}$ | 0, 0 |
| ACK, ACK, ACK, NACK/DTX | NACK/DTX, any, any, any | $n_{PUCCH,1}^{(1)}$ | 1, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 |
| ACK, ACK, NACK/DTX, any | NACK/DTX, any, any, any | $n_{PUCCH,1}^{(1)}$ | 0, 1 |
| ACK, ACK, NACK/DTX, any | (ACK, NACK/DTX, any, any), except for (ACK, DTX, DTX, DTX) | $n_{PUCCH,1}^{(1)}$ | 0, 1 |
| ACK, DTX, DTX, DTX | NACK/DTX, any, any, any | $n_{PUCCH,0}^{(1)}$ | 1, 1 |
| ACK, DTX, DTX, DTX | (ACK, NACK/DTX, any, any), except for (ACK, DTX, DTX, DTX) | $n_{PUCCH,0}^{(1)}$ | 1, 1 |
| ACK, ACK, ACK, ACK | NACK/DTX, any, any, any | $n_{PUCCH,0}^{(1)}$ | 1, 1 |
| ACK, ACK, ACK, ACK | (ACK, NACK/DTX, any, any), except for (ACK, DTX, DTX, DTX) | $n_{PUCCH,0}^{(1)}$ | 1, 1 |
| NACK, any, any, any | NACK/DTX, any, any, any | $n_{PUCCH,0}^{(1)}$ | 0, 0 |
| NACK, any, any, any | (ACK, NACK/DTX, any, any), except for (ACK, DTX, DTX, DTX) | $n_{PUCCH,0}^{(1)}$ | 0, 0 |
| (ACK, NACK/DTX, any, any), except for (ACK, DTX, DTX, DTX) | NACK/DTX, any, any, any | $n_{PUCCH,0}^{(1)}$ | 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 |
| DTX, any, any, any | NACK/DTX, any, any, any | | No Transmission |
| DTX, any, any, any | (ACK, NACK/DTX, any, any), except for (ACK, DTX, DTX, DTX) | | No Transmission |

In Tables 10 and 11 above, first and second cells respectively indicate primary and secondary cells. HARQ-ACK(j) denotes ACK/NACK corresponding to a PDSCH scheduled by a PDCCH of which a DAI value is j+1, or denotes ACK/NACK corresponding to a PDCCH which requests an ACK/NACK response, for example, an SPS release PDCCH indicating a release of semi-persistent scheduling (herein, j is 0≤j≤M−1). However, if the SPS PDSCH exists, HARQ- ACK(0) denotes ACK/NACK for an SPS PDSCH, and HARQ-ACK(j>0) denotes ACK/NACK corresponding to a PDSCH scheduled by a PDCCH of which a DAI value is j.

Hereinafter, it is described a method of allocating resources to transmit ACK/NACK by multiplexing the ACK/NACK with a PUCCH format 1 b using the aforementioned channel selection. It is assumed hereinafter that a TDD mode is used, M is greater than 2, and two serving cells are configured. As described above, M is the number of DL subframes corresponding to one UL subframe in each DL CC. In this case, for the channel selection, ACK/NACK information is transmitted by selecting any one of 4 resources $n^{(1)}_{PUCCH,0}$, $n^{(1)}_{PUCCH,1}$, $n^{(1)}_{PUCCH,2}$, and $n^{(1)}_{PUCCH,3}$. In this case, which method will be used to allocate the two resources is a matter to be considered.

[Resource Allocation Method in Channel Selection when Configuring Cross-Carrier Scheduling]

1. When there is no SPS PDSCH transmission.

When cross-carrier scheduling is configured, a UE receives a PDCCH for scheduling a PDSCH and an SPS release PDCCH only in a primary cell. If there is no SPS PDSCH transmission in the primary cell or if there is no subframe configured to receive the SPS PDSCH, a resource used in channel selection can be allocated dynamically.

That is, two dynamic resources linked to two PDCCHs having the smallest DAI values among PDCCHs for scheduling the primary cell and two dynamic resources linked to two PDCCH having the smallest DAI values among PDCCHs for scheduling a secondary cell can be allocated for channel selection. Herein, the PDCCH for scheduling the primary cell include not only a normal PDCCH for scheduling a PDSCH but also any PDCCH (e.g., an SPS release PDCCH) for requiring an ACK/NACK response. Although the normal PDCCH for scheduling the PDSCH and the SPS release PDCCH will be exemplified in the description of the present invention hereinafter, the present invention is not limited thereto, and thus any PDCCH for requesting an ACK/NACK response can also be included.

For example, if the UE detects a PDCCH of which a DAI value is 1 or 2 in a subframe $n-k_m$ of the primary cell and receives a PDSCH indicated by the PDCCH in the primary cell, or if the UE detects an SPS release PDCCH of which a DAI value is 1 or 2 in the subframe $n-k_m$ of the primary cell, a PUCCH resource $n^{(1)}_{PUCCH,i}$ for transmitting ACK/NACK can be allocated as shown in equation 3 below. Herein, $k_m \in K$, and a DAI value of a PDCCH at $k_m$ is 1 or 2. K is described above with reference to Table 5.

$$n^{(1)}_{PUCCH,i} = (M-m-1) \times N_c + m \times N_{c+1} + n_{CCE,m\ PUCCH} + N^{(1)}_{PUCCH}$$ [Equation 3]

Herein, c is selected from {0, 1, 2, 3} to satisfy $N_c \leq n_{CCE,m} < N_{c+1}$. $N^{(1)}_{PUCCH}$ is a value determined by using a higher layer signal. $N_c$ may be $\max\{0, \text{floor } [N^{DL}_{RB} \times (N^{RB}_{sc} \times c - 4)/36]\}$. $N^{DL}_{RB}$ is the number of RBs based on a configured DL bandwidth, and $N^{RB}_{sc}$ is a size of a resource block indicated with the number of subcarriers in the frequency domain. $n_{CCE,m}$ is a first CCE number used in transmission of a corresponding PDCCH at a subframe $n-k_m$.

In Equation 3, $n^{(1)}_{PUCCH,0}$ that is, i=0, denotes a PUCCH resource dynamically determined in association with a PDCCH (i.e., a PDCCH for scheduling a primary cell) of which a DAI value is 1, and $n^{(1)}_{PUCCH,1}$ that is, i=1, denotes a PUCCH resource dynamically determined in association with a PDCCH (i.e., a PDCCH for scheduling a primary cell) of which a DAI value is 2.

If the UE detects a PDCCH of which a DAI value is 1 or 2 in the subframe $n-k_m$ of the primary cell and receives a PDSCH indicated by the PDCCH in the secondary cell, a PUCCH resource is allocated according to Equation 3 above. In this case, the PDCCH is a PDCCH for scheduling a PDSCH transmitted in the secondary cell. That is, $n^{(1)}_{PUCCH,2}$ that is, i=2, denotes a PUCCH resource dynamically determined in association with a PDCCH (i.e., a PDCCH for scheduling a secondary cell) of which a DAI value is 1, and $n^{(1)}_{PUCCH,3}$, that is, i=3, denotes a PUCCH resource dynamically determined in association with a PDCCH (i.e., a PDCCH for scheduling a secondary cell) of which a DAI value is 2.

Figure 10:
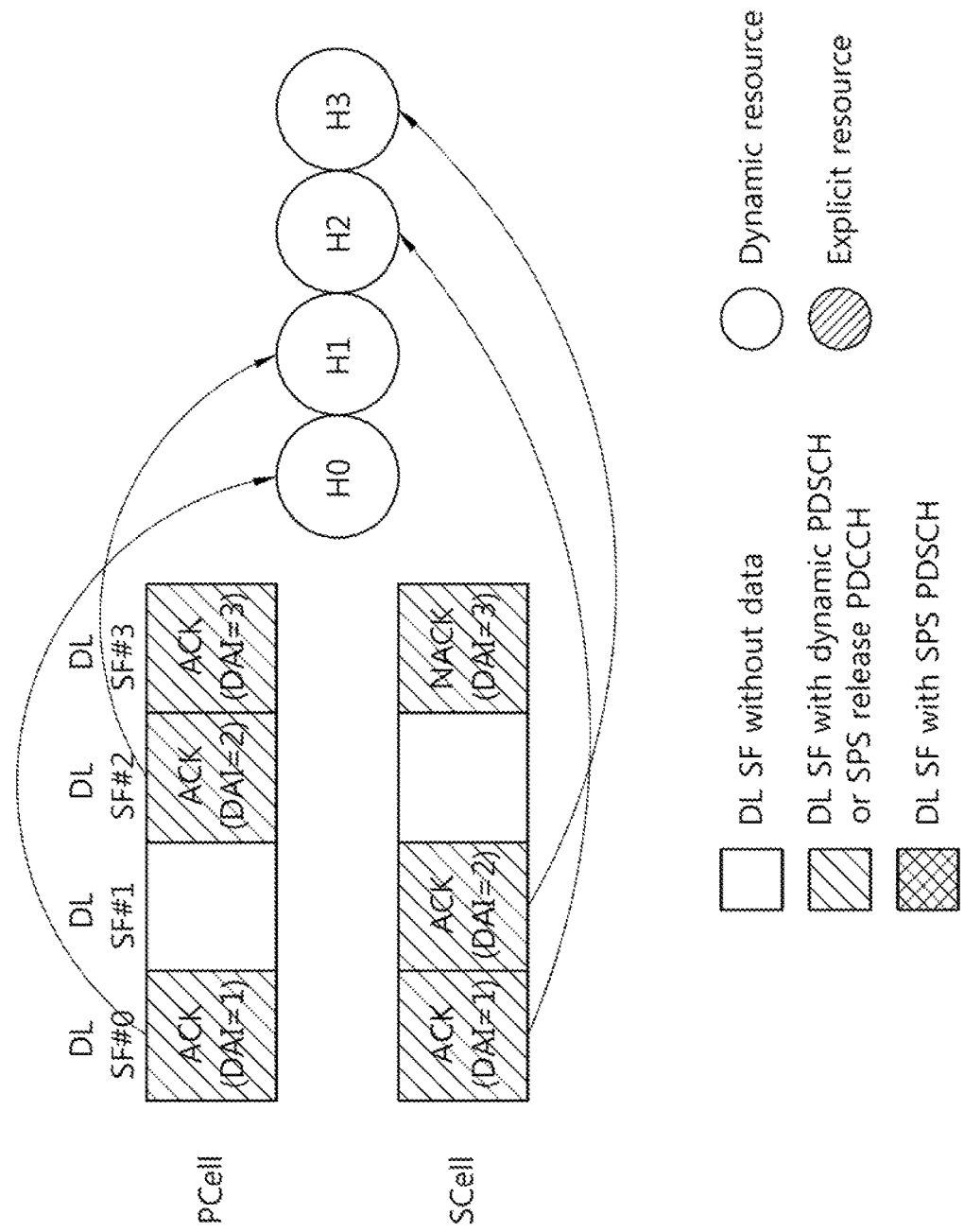
FIG. 10 shows an ACK/negative-ACK (NACK) resource allocation method in case of cross carrier scheduling.

FIG. 10 shows an ACK/NACK resource allocation method in case of the aforementioned cross carrier scheduling.

Referring to FIG. 10, since a PDCCH of which a DAI is 1 is received in a DL subframe #0 of a primary cell, H0 (i.e., $n^{(1)}_{PUCCH,0}$) linked to the PDCCH is allocated. In addition, since a PDCCH of which a DAI is 2 is received in a DL subframe #2, H1 (i.e., $n^{(1)}_{PUCCH,1}$) linked to the PDCCH is allocated. In addition, if DAI values of PDCCHs for scheduling a PDSCH of DL subframes #0 and #1 of the secondary cell correspond to 1 and 2 in that order, H2 (i.e., $n^{(1)}_{PUCCH,2}$) and H3 (i.e., $n^{(1)}_{PUCCH,3}$) linked to the corresponding PDCCHs are allocated.

Figure 11:
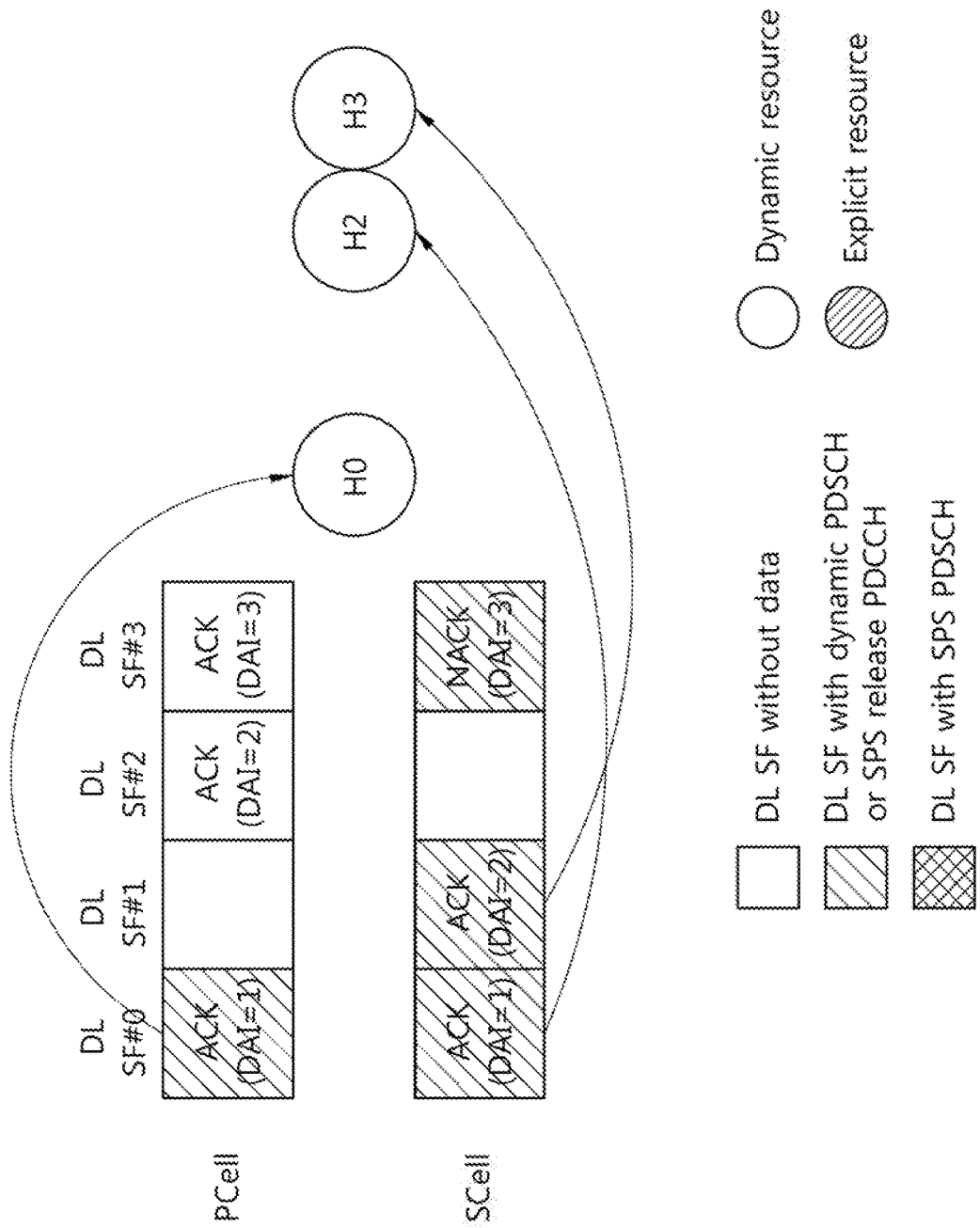
FIG. 11 shows an example in which an ACK/NACK resource allocation method is modified in case of cross carrier scheduling.

FIG. 11 shows an example in which an ACK/NACK resource allocation method is modified in case of the aforementioned cross carrier scheduling.

FIG. 11 differs from FIG. 10 in that a UE fails to receive a PDCCH with DAI=2 among PDCCHs for scheduling a primary cell. In this case, the UE allocates only a resource H0 linked to a PDCCH with DAI=1 and resources H2 and H3 linked to PDCCHs with DAI=1 and DAI=2 among PDCCHs for scheduling a secondary cell. There is no problem even if the UE does not allocate a resource H1 linked to the PDCCH with DAI=2 (for scheduling the primary cell). This is because, as shown in Table 8 above, the resource 1 (H1) is used when ACK is transmitted for a PDSCH schedule by the PDCCH with DAI=2. However, the UE fails to receive the PDCCH with DAI=2, and thus there is no case where ACK is transmitted for the PDSCH scheduled by the PDCCH with DAI=2. Eventually, it is not a problem even if PUCCH resource allocation recognition is mismatched between the BS and the UE.

2. When there is SPS PDSCH Transmission

If an SPS PDSCH is included in DL subframes of a primary cell, a resource for channel selection can be allocated as follows.

The SPS PDSCH does not have a PDCCH for scheduling. Thus, a resource for channel selection is reserved through a higher layer signal, and the reserved resource can be allocated to H0 (i.e., $n^{(1)}_{PUCCH,0}$). For example, four resources (i.e., a first PUCCH resource, a second PUCCH resource, a third PUCCH resource, and a fourth PUCCH resource) can be reserved by using an RRC signal, and one resource can be indicated by using a transmission power control (TPC) field of a PDCCH for activating SPS scheduling.

Table 12 below shows an example of indicating a resource for channel selection according to the TPC field value.

TABLE 12

| TPC field value | Resource for channel selection |
| --- | --- |
| '00' | 1st PUCCH resource |
| '01' | 2nd PUCCH resource |

TABLE 12-continued

| TPC field value | Resource for channel selection |
| --- | --- |
| '10' | 3$^{rd}$ PUCCH resource |
| '11' | 4$^{th}$ PUCCH resource |

A resource linked to a PDCCH (including an SPS release PDCCH) of which a DAI is 1 in a primary cell is allocated to H1 (i.e., $n^{(1)}_{PUCCH,1}$). Dynamic resources linked to PDCCHs with DAI=1 and DAI=2 among PDCCHs for scheduling a secondary cell are respectively H2 (i.e., $n^{(1)}_{PUCCH,2}$) and H3 (i.e., $n^{(1)}_{PUCCH,3}$). In this case, Equation 3 above can be used.

Figure 12:
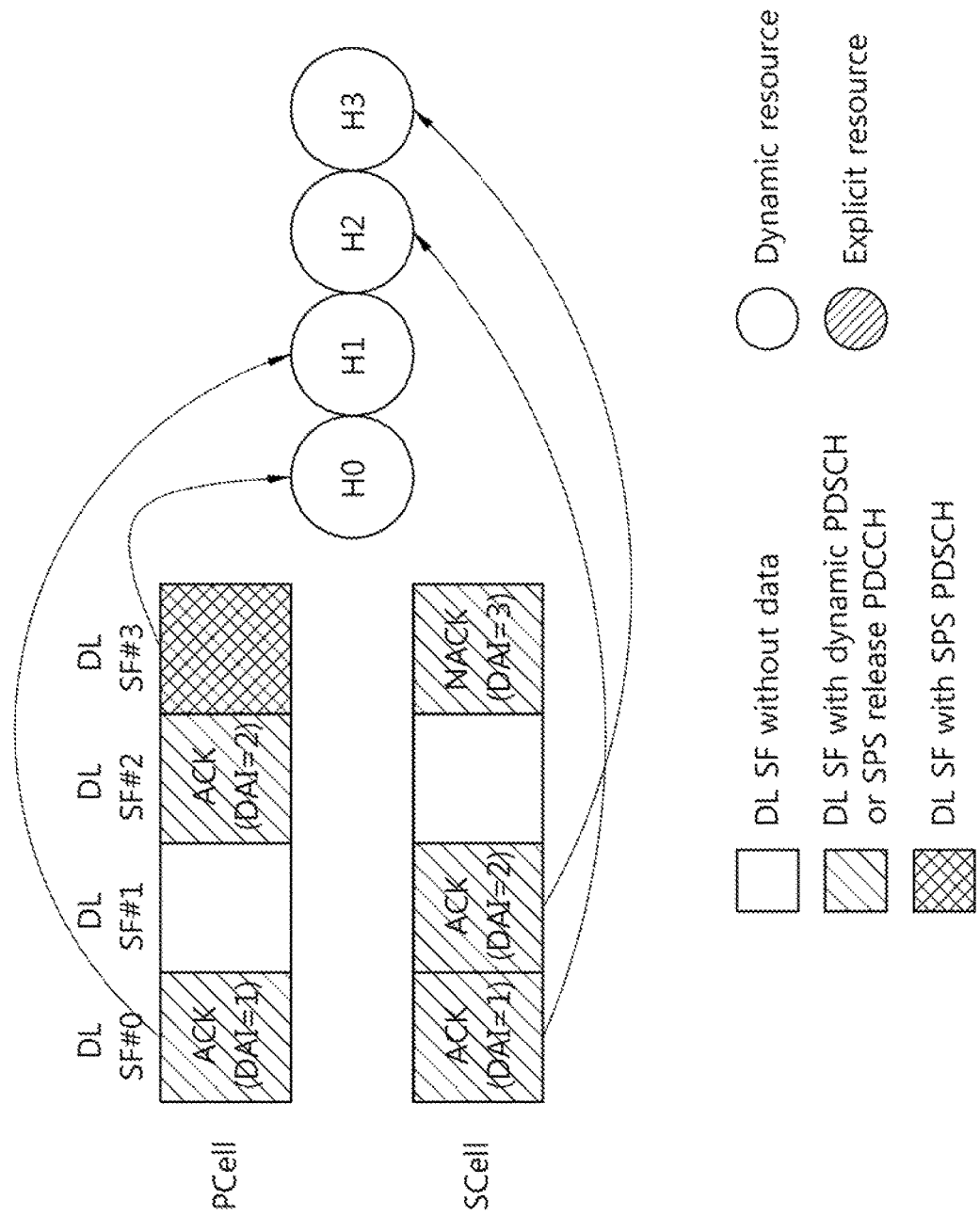
FIG. 12 shows an example of an ACK/NACK resource allocation method when there is SPS physical downlink shared channel (PDSCH) transmission in case of cross carrier scheduling.

FIG. 12 shows an example of an ACK/NACK resource allocation method when there is SPS PDSCH transmission in case of cross carrier scheduling. It is assumed in FIG. 12 that channel selection is performed according to Table 8 above.

Referring to FIG. 12, a UE allocates a reserved resource to H0 by using a higher layer signal when an SPS PDSCH is received in a DL subframe #3 of a primary cell. A resource linked to a PDCCH with DAI=1 in the primary cell is allocated to H1. A resource linked to a PDCCH with DAI=1 among PDCCHs for scheduling a secondary cell is allocated to H2. A resource linked to a PDCCH with DAI=2 is allocated to H3.

In case of using channel selection based on Table 9, the resource H3 can be modified in such a manner that dynamic signaling of a PDCCH is selected after securing the resource in advance by using a higher layer signal.

If the UE fails to receive PDCCHs with DAI=1 and DAI=2, since corresponding resources are not used in mapping according to the characteristics described in Table 8 to Table 10, the corresponding resources may be left unused while using only the remaining resources in the channel selection.

For ACK/NACK detection, a BS can detect ACK/NACK in a channel selection manner by searching for only PUCCH format 1a/1b resources allocated with SPS and resources linked to PDCCHs with DAI=1 and 2 among PDCCHs transmitted from the BS. According to this method, mismatch of PUCCH resources can be avoided.

[Resource Allocation Method in Channel Selection when Non-Cross Carrier Scheduling is Configured]

When non-cross carrier scheduling is configured, a PDCCH (or an SPS release PDCCH) for scheduling a PDSCH transmitted in a primary cell is transmitted in the primary cell, and a PDCCH for scheduling a PDSCH transmitted in a secondary cell is transmitted in the secondary cell. In this case, four resources for channel selection are allocated by using the following method.

First, if there is no SPS PDSCH transmission in the primary cell, two resources linked to PDCCHs with DAI value 1 and 2 among PDCCHs (including an SPS release PDCCH) for scheduling a PDSCH transmitted in the primary call are allocated to H0 and H1. In this case, Equation 3 can be used.

If an SPS PDSCH is included in DL subframes of the primary cell, a resource for channel selection can be reserved through a higher layer signal, and the reserved resource can be allocated to H0 (i.e., $n^{(1)}_{PUCCH,0}$). For example, four resources (i.e., a first PUCCH resource, a second PUCCH resource, a third PUCCH resource, and a fourth PUCCH resource) can be reserved by using an RRC signal, and one resource can be indicated by using a transmission power control (TPC) field of a PDCCH for activating SPS scheduling. In addition, a resource linked to a PDCCH (including an SPS release PDCCH) of which a DAI is 1 in a primary cell is allocated to H1 (i.e., $n^{(1)}_{PUCCH,1}$).

Regarding the remaining two resources H2 and H3, a plurality of resources are reserved by using a higher layer signal and thereafter two resources are selected from the plurality of resources. In this case, the two resources can be selected from the plurality of resources by dedicatedly using a TPC field included in a PDCCH for scheduling the secondary cell as an ACK/NACK resource indicator (ARI).

For example, an RRC signal can be used to reserve four resource pairs (i.e., 8 resources in total) and thereafter any one resource pair can be indicated among the four resource pairs according to a bit value of a 2-bit TPC field.

In this case, all PDCCHs for scheduling the secondary cell may have the same value in the TPC field in M corresponding DL subframes of the secondary cell, and the UE can assume that the all PDCCHs have the same value in the TPC field.

Alternatively, among the PDCCHs for scheduling the secondary cell, only a TPC field of a PDCCH with DAM can be used dedicatedly for an ARI, and a TPC field of a PDCCH of which a DAI value is greater than 1 can be used for its original usage, i.e., for transmit power control. If the UE fails to receive the PDCCH with DAI=1, the UE transmits '0' as an ACK counter value. Referring to Table 8 above, ACK/NACK of which an ACK counter value of a secondary cell is 0 uses only H0 and H1, and thus allocation of resources such as H2 and H3 are not necessary.

For another example, the RRC signal can be used to reserve 8 resources and thereafter two resources can be indicated by using two 2-bit TPC fields. Among PDCCHs for scheduling a secondary cell, a TPC field of a PDCCH with DAI=1 and a TPC field of a PDCCH with DAI=2 can be used. Among the PDCCHs for scheduling the secondary cell, a TPC field is used for its original usage with respect to a PDCCH of which a DAI value is greater than or equal to 2. According to this method, since each TPC field indicates one of the four resources, two resources H2 and H3 can be indicated independently by using two TPC fields. Therefore, resource utilization of the BS can be increased.

Hereinafter, a case in which ACK/NACK for two DL subframes is transmitted in one UL subframe in each DL CC of a multiple carrier system, that is, a case of M=2, will be described.

For example, it is assumed that a UE aggregates two DL CCs and a DL subframe (SF):UL SF=2:1 is satisfied (i.e., two DL SFs are linked to one UL SF). If both of the two DL CCs are not set to a MIMO mode, 4-bit ACK/NCK can be transmitted by using 4-bit channel selection without having to perform bundling.

If any one of two DL CCs is set to the MIMO mode, 4-bit ACK/NACK which is bundled using spatial bundling can be transmitted through channel selection. Herein, the spatial bundling implies that an AND operation is performed on ACK/NACK for a plurality of transmission blocks (or codewords) received in the same subframe.

The UE can aggregate two DL CCs, and in case of DL SF:UL SF=2:1, can transmit ACK/NACK by using channel selection. A resource allocation method for channel selection in this case will be described. This resource allocation method is a method of preventing a problem occurring in ACK/NACK transmission when the number of DL CCs recognized by the BS differs from the number of DL CCs recognized by the UE or when a ratio of DL SF:UL SF is recognized differently between the BS and the UE.

Mapping used for transmission of 2-bit ACK/NACK is as shown in Table 13 below.

TABLE 13

| B0  | B1  | Channel         | constellation   |
|-----|-----|-----------------|-----------------|
| D   | N/D | NO TRANSMISSION | NO TRANSMISSION |
| N   | N/D | H0              | 1               |
| A   | N/D | H0              | −1              |
| N/D | A   | H1              | −j              |
| A   | A   | H1              | j               |

Method A. When Cross-Carrier Scheduling is Configured.

Figure 13:
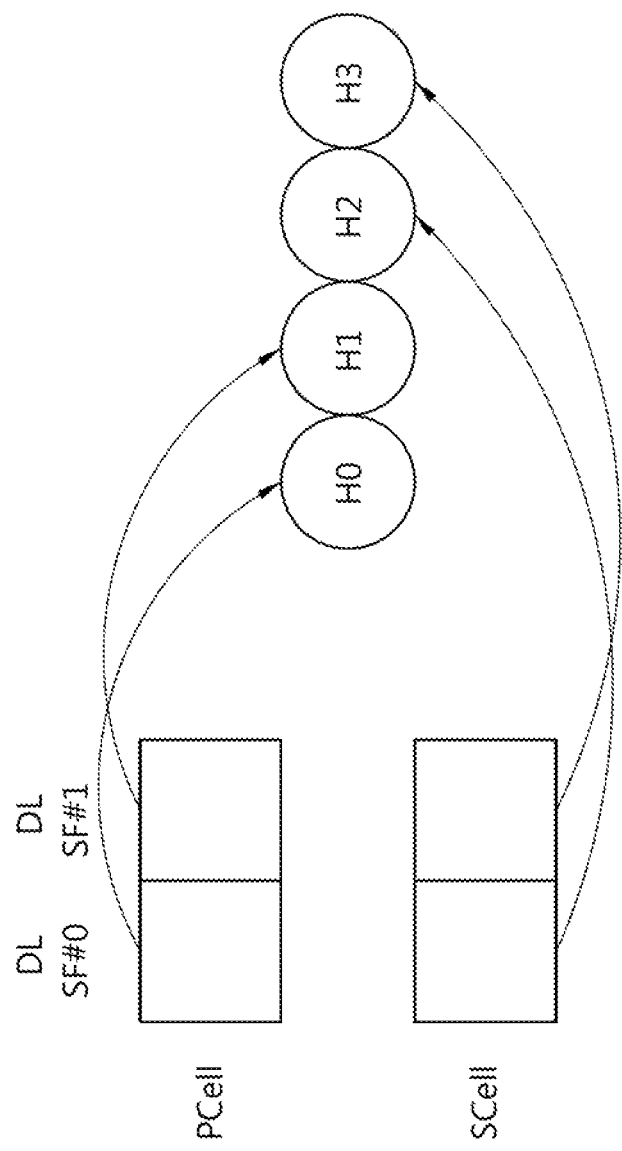
FIG. 13 shows an example of resource allocation for channel selection when cross-carrier scheduling is configured.

FIG. 13 shows an example of resource allocation for channel selection when cross-carrier scheduling is configured.

When the cross-carrier scheduling is configured, PDCCHs for scheduling a primary cell and PDCCHs for scheduling a secondary cell are all transmitted through the primary cell. Among the PDCCHs for scheduling the primary cell, a resource linked to a first PDCCH (e.g., included in a DL SF #0) is allocated to H0, a resource linked to a second PDCCH (e.g., included in a DL SF #1) is allocated to H1. Among the PDCCHs for scheduling the secondary cell, a resource linked to a first PDCCH (e.g., a DL SF #0) is allocated to H2, and a resource linked to a second PDCCH (e.g., a DL SF #1) is allocated to H3. If the UE fails to receive a PDCCH for scheduling a specific CC in a specific subframe, a corresponding resource is not used in channel selection, and the corresponding resource may be left unused and channel selection is performed by using only the remaining secured resources.

By allocating resources in this manner, ACK/NACK can be transmitted in an error-free manner even if the number of assigned DL CCs is recognized differently between the BS and the UE. That is, an error does not occur even if the UE performs channel selection by using Table 8 and the BS misunderstands that the UE performs the channel selection by using Table 13. This is because a resource, a signal constellation, etc., of Table 13 are the same as those of a case where ACK/NACK of the secondary cell is all N/D (i.e., a state indicating that an ACK counter value of the secondary cell is 0) in Table 8.

Figure 14:
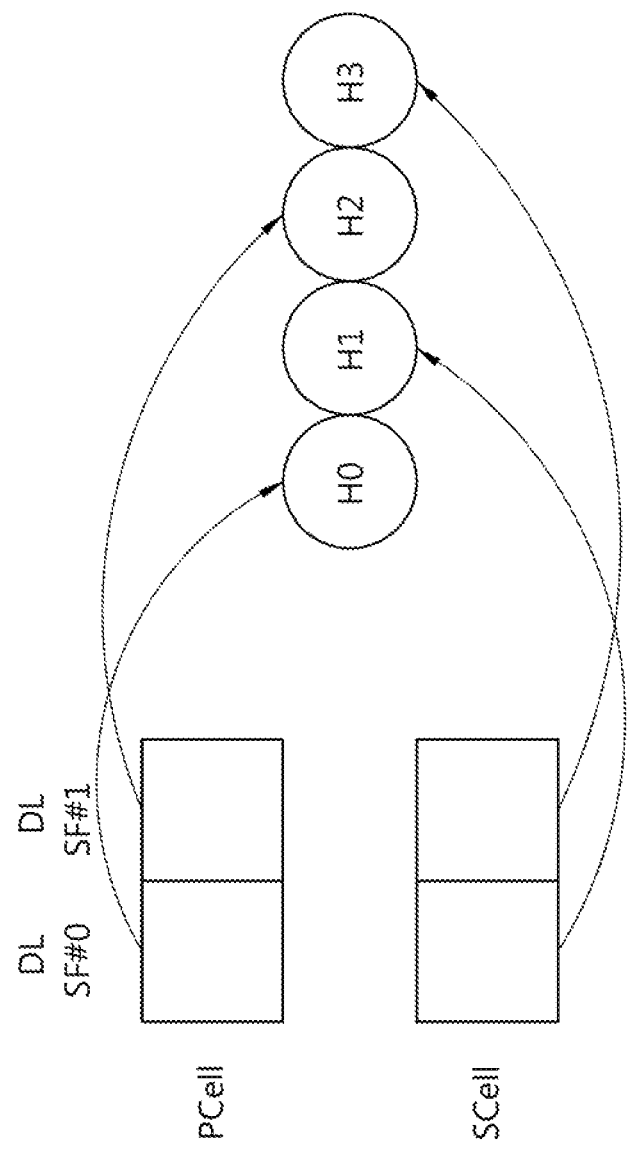
FIG. 14 shows another example of resource allocation for channel selection when cross carrier scheduling is configured.

FIG. 14 shows another example of resource allocation for channel selection when cross carrier scheduling is configured.

Among PDCCHs for scheduling a primary cell, a resource linked to a first PDCCH (e.g., included in a DL SF #0) is allocated to H0, and a resource linked to a second PDCCH (e.g., included in a DL SF #1) is allocated not to H1 but to H2. Among PDCCHs for scheduling a secondary cell, a resource linked to a first PDCCH (e.g., included in a DL SF #0) is allocated not to H2 but to H1, and a resource liked to a second PDCCH (e.g., included in a DL SF #1) is allocated to H3. If a UE fails to receive a PDCCH for scheduling a specific CC in a specific subframe, a corresponding resource is not used in channel selection, and the corresponding resource may be left unused and channel selection is performed by using only the remaining secured resources. By allocating resources in this manner, ACK/NACK can be transmitted in an error-free manner even if a value M, i.e., the number of DL subframes mapped to one UL subframe, determined between a BS and the UE is incorrectly recognized. For example, an error does not occur even if the UE recognizes a ratio of DL SF:UL SF as 2:1 and thus uses Table 8 as a channel selection table, whereas the BS recognizes the ratio of DL SF:UL SF as 1:1 and thus uses Table 13 as the channel selection table.

Method B. When Non-Cross Carrier Scheduling is Configured.

Figure 15:
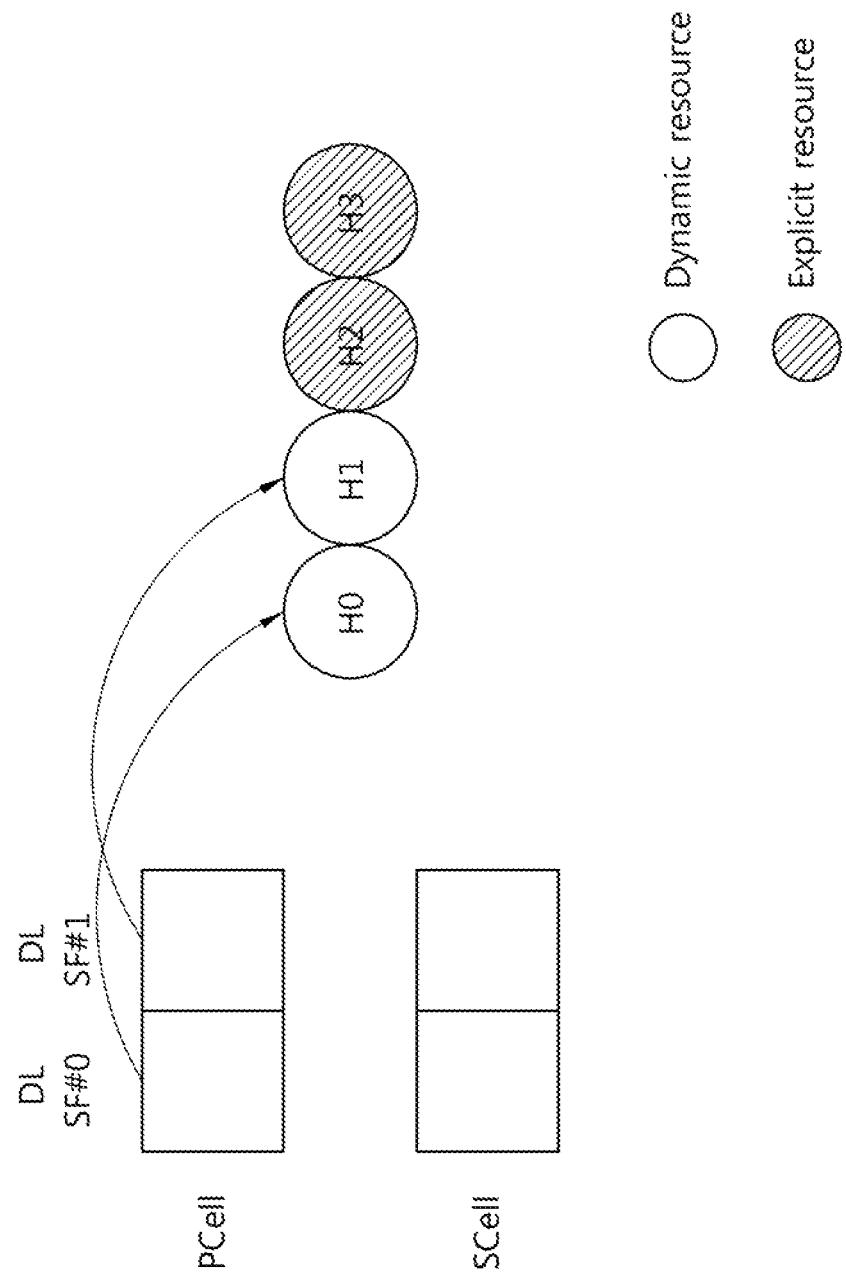
FIG. 15 shows an example of a resource allocation method when non-cross carrier scheduling is configured.

FIG. 15 shows an example of a resource allocation method when non-cross carrier scheduling is configured.

If a PDCCH for scheduling a primary cell exists in a DL subframe #0, a dynamic resource linked to the PDCCH is allocated to H0. If a PDCCH for scheduling the primary cell exists in a DL subframe #1, a dynamic resource H1 linked to the PDCCH is allocated to H1.

In addition, a dynamic resource linked to a PDCCH for scheduling a secondary cell is not used in channel selection. Instead, resources for the channel selection are selected in such a manner that resources for the secondary cell are reserved in advance by using a higher layer signal and a TPC included in a PDCCH for scheduling the secondary cell is dedicatedly used as an ARI.

In this case, two resources can be selected by dedicatedly using a TPC field included in the PDCCH for scheduling the secondary cell as an ARI. For example, an RRC signal can be used to reserve four resource pairs (i.e., 8 resources in total) and thereafter any one resource pair can be indicated among the four resource pairs according to a bit value of a 2-bit TPC field. In this case, among the PDCCHs for scheduling the secondary cell, only a TPC field of a PDCCH with DAI=1 can be used dedicatedly for an ARI, and a TPC field of a PDCCH of which a DAI value is greater than 1 can be used for its original usage, i.e., for transmit power control.

For another example, the RRC signal can be used to reserve 8 resources and thereafter two resources can be indicated by using two 2-bit TPC fields. Among PDCCHs for scheduling a secondary cell, a TPC field of a PDCCH with DAI=1 and a TPC field of a PDCCH with DAI=2 can be used. Among the PDCCHs for scheduling the secondary cell, a TPC field is used for its original usage with respect to a PDCCH of which a DAI value is greater than or equal to 2. According to this method, since each TPC field indicates one of the four resources, two resources H2 and H3 can be indicated independently by using two TPC fields. Therefore, resource utilization of the BS can be increased.

Figure 16:
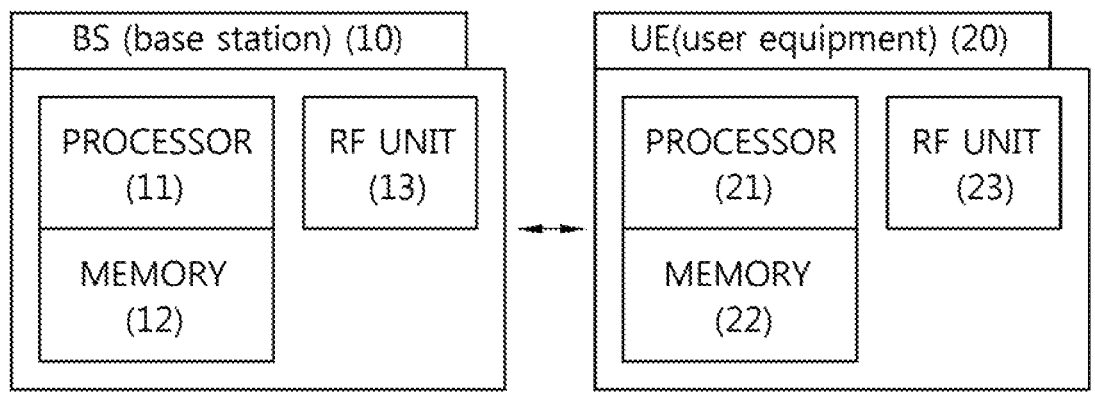
FIG. 16 is a block diagram of a wireless apparatus for implementing an embodiment of the present invention.

FIG. 16 is a block diagram of a wireless apparatus for implementing an embodiment of the present invention.

A UE 20 includes a memory 22, a processor 21, and a radio frequency (RF) unit 23. The memory 22 coupled to the processor 21 stores a variety of information for driving the processor 21. The RF unit 23 coupled to the processor 21 transmits and/or receives a radio signal. The processor 21 implements the proposed functions, procedure, and/or methods. In the aforementioned embodiments, an operation of the UE can be implemented by the processor 21. The processor 21 receives M DL subframes associated with a UL subframe n in each of two serving cells, and determines four candidate resources on the basis of the M DL subframes received in each of the two serving cells. Further, the processor 21 transmits an ACK/NACK response for the M DL subframes received in each of the two serving cells by using one resource selected from the four candidate resources in the UL subframe n. In this case, the two serving cells consist of a first serving cell and a second serving cell, and among the four candidate resources, a first resource and a second resource are related to a physical downlink shared channel (PDSCH) received in the first serving cell or a semi-persistent scheduling (SPS) release PDCCH for releasing semi-persistent scheduling, and a third resource and a fourth resources are related to a PDSCH received in the second serving cell.

Further, the processor 21 configures ACK/NACK, and transmits the ACK/NACK through a PUSCH ora PUCCH.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for receiving positive-acknowledgement (ACK)/negative-acknowledgement (NACK) in a time division duplex (TDD)-based wireless communication system, the method performed by a base station and comprising:
    transmitting, to a user equipment (UE), at least one data during M downlink subframes related to an uplink subframe N in each of two serving cells, wherein M is an integer larger than 2; and
    receiving, from the UE, ACK/NACK information for the at least one data through one resource among four candidate resources in the uplink subframe N,
    wherein:
        based on a first PDSCH which is related to a first physical downlink control channel (PDCCH) with a downlink assignment index (DAI) value equal to 1 on a first serving cell and a second PDSCH which is related to a second PDCCH with a DAI value equal to 2 on the first serving cell, being transmitted during the M downlink subframes in the first serving cell, or
        based on a first semi-persistent scheduling (SPS) release PDCCH with a DAI value equal to 1 and a second SPS release PDCCH with a DAI value equal to 2 being transmitted during the M downlink subframes in the first serving cell:
        a first candidate resource is determined based on a first control channel element (CCE) used for transmission of the first PDCCH with the DAI value equal to 1 or the first SPS release PDCCH with the DAI value equal to 1 and a second candidate resource is determined based on a first CCE used for transmission of the second PDCCH with the DAI value equal to 2 or the second SPS release PDCCH with the DAI value equal to 2,
    wherein:
        based on a third PDSCH which is related to a third PDCCH on the second serving cell and a fourth PDSCH which is related to a fourth PDCCH on the second serving cell, being transmitted during the M downlink subframes in a second serving cell:
        a third candidate resource is determined based on a field included in the third PDCCH among a plurality candidate resources configured by a higher layer signal and a fourth candidate resource is determined based on a field included in the fourth PDCCH among the plurality candidate resources configured by the higher layer signal, and
    wherein the ACK/NACK information is informed by a combination of the one resource among the four candidate resources and 2-bits information received through the one resource.

2. The method of claim 1, wherein the base station transmits a PDCCH comprising a downlink grant and a PDSCH corresponding to the PDCCH in at least one downlink subframe among the M downlink subframes on the primary serving cell.

3. The method of claim 2, wherein the downlink grant includes a downlink assignment index (DAI) indicating an accumulative number of PDCCH with assigned PDSCH transmission.

4. A base station (BS) operated in a time division duplex (TDD)-based wireless communication system, the BS comprising:
    a radio frequency (RF) unit configured to transmit or receive a radio signal; and
    a processor coupled to the RF unit,
    wherein the processor is configured to:
    transmit, to a user equipment (UE), at least one data during M downlink subframes related to an uplink subframe N in each of two serving cells, wherein M is an integer larger than 2, and
    receive, from the UE, ACK/NACK information for the at least one data through one resource among four candidate resources in the uplink subframe N,
    wherein:
        based on a first PDSCH which is related to a first physical downlink control channel (PDCCH) with a downlink assignment index (DAI) value equal to 1 on a first serving cell and a second PDSCH which is related to a second PDCCH with a DAI value equal to 2 on the first serving cell, being transmitted during the M downlink subframes in the first serving cell, or
        based on a first semi-persistent scheduling (SPS) release PDCCH with a DAI value equal to 1 and a second SPS release PDCCH with a DAI value equal to 2 being transmitted during the M downlink subframes in the first serving cell:
        a first candidate resource is determined based on a first control channel element (CCE) used for transmission of the first PDCCH with the DAI value equal to 1 or the first SPS release PDCCH with the DAI value equal to 1 and a second candidate resource is determined based on a first CCE used for transmission of the second PDCCH with the DAI value equal to 2 or the second SPS release PDCCH with the DAI value equal to 2, wherein:
        based on a third PDSCH which is related to a third PDCCH on the second serving cell and a fourth PDSCH which is related to a fourth PDCCH on the second serving cell, being transmitted during the M downlink subframes in a second serving cell:
        a third candidate resource is determined based on a field included in the third PDCCH among a plurality candidate resources configured by a higher layer signal and a fourth candidate resource is determined based on a field included in the fourth PDCCH among the plurality candidate resources configured by the higher layer signal, and wherein the ACK/NACK information is informed by a combination of the one resource among the four candidate resources and 2-bits information received through the one resource.

5. The BS of claim 4, wherein the base station transmits a PDCCH comprising a downlink grant and a PDSCH corresponding to the PDCCH in at least one downlink subframe among the M downlink subframes on the primary serving cell.

6. The BS of claim 5, wherein the downlink grant includes a downlink assignment index (DAI) indicating an accumulative number of PDCCH with assigned PDSCH transmission.

* * * * *